(12) United States Patent
Adduci

(10) Patent No.: US 8,098,720 B2
(45) Date of Patent: Jan. 17, 2012

(54) METHOD AND APPARATUS FOR SUPPRESSING ADJACENT CHANNEL INTERFERENCE AND MULTIPATH PROPAGATION SIGNALS AND RADIO RECEIVER USING SAID APPARATUS

(75) Inventor: Francesco Adduci, Agrate Brianza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1134 days.

(21) Appl. No.: 11/869,661

(22) Filed: Oct. 9, 2007

(65) Prior Publication Data

US 2008/0084953 A1   Apr. 10, 2008

(30) Foreign Application Priority Data

Oct. 6, 2006   (EP) .................................... 06425683
Oct. 6, 2006   (EP) .................................... 06425686

(51) Int. Cl.
*H04B 3/46* (2006.01)
*H04B 15/00* (2006.01)
*H04L 25/03* (2006.01)

(52) U.S. Cl. ........ 375/224; 375/316; 375/285; 375/296; 375/346

(58) Field of Classification Search .......... 375/219–222, 375/240.26–240.29, 244, 247–252, 254, 375/265, 262, 278, 284, 285, 295–298, 299, 375/316–318, 324–325, 340–344, 346–347
See application file for complete search history.

(56) References Cited

U.S. PATENT DOCUMENTS

| | | | |
|---|---|---|---|
| 6,430,724 B1 | 8/2002 | Laneman et al. | |
| 7,221,925 B2 | 5/2007 | Wildhagen | |
| 7,379,493 B2* | 5/2008 | Howard | 375/224 |
| 7,436,902 B2* | 10/2008 | Shen et al. | 375/308 |
| 7,489,907 B2* | 2/2009 | Hasegawa et al. | 455/69 |
| 7,609,614 B2* | 10/2009 | Fonseka et al. | 370/208 |

(Continued)

FOREIGN PATENT DOCUMENTS

EP   0939496 A1   9/1999

(Continued)

OTHER PUBLICATIONS

Reza Moghimi, Ask the Applications Engineer, Analog Dialogue 37, Apr. 2003, pp. 1-5.*

(Continued)

*Primary Examiner* — Dac V. Ha
*Assistant Examiner* — Linda Wong
(74) *Attorney, Agent, or Firm* — Lisa K. Jorgenson; Timothy L. Boller; Seed IP Law Group PLLC

(57) ABSTRACT

A method detects multipath propagation in a modulated digital signal. The method provides a first value of channel frequency, representing the modulated digital signal free of multipath propagation, providing a second value of said channel frequency, representing the modulated digital signal with multipath propagation, and comparing the first and second values. A method detects adjacent channel interference in a modulated digital signal by comparing first and second values of a characteristic parameter of the digital signal, respectively representing the digital signal free of adjacent channel interference and the digital signal affected by adjacent channel interference. In particular, the method obtains a derivative signal, applies a non-linear Teager-Kaiser function to the digital signal and the derivative signal for generating first and second signals respectively representing energy content of the digital signal and energy content of the derivative signal, and processes the first and second signals for generating the second value.

42 Claims, 8 Drawing Sheets

U.S. PATENT DOCUMENTS

| | | | |
|---|---|---|---|
| 2003/0207669 A1 | 11/2003 | Kroeger | |
| 2004/0017867 A1* | 1/2004 | Thomas et al. | 375/346 |
| 2004/0042571 A1 | 3/2004 | Bouillet | |
| 2004/0266357 A1 | 12/2004 | Guchhait | |
| 2005/0193047 A1* | 9/2005 | Fu et al. | 708/300 |
| 2005/0254609 A1* | 11/2005 | Varma et al. | 375/350 |
| 2005/0276365 A1 | 12/2005 | Gierl et al. | |
| 2006/0063491 A1* | 3/2006 | Sudo | 455/63.1 |
| 2007/0105520 A1* | 5/2007 | Van Houtum | 455/296 |
| 2008/0033695 A1* | 2/2008 | Sahara et al. | 702/185 |

FOREIGN PATENT DOCUMENTS

| | | |
|---|---|---|
| WO | 03/039012 A1 | 5/2003 |
| WO | 2004047322 A1 | 6/2004 |

OTHER PUBLICATIONS

Kaiser, "On a simple algorithm to calculate the 'energy' of a signal," IEEE, vol. S7.3, 1990, pp. 381-384.

Hamila et al., "Subchip Multipath Delay Estimation for Downlink WCDMA System Based on Teager-Kaiser Operator," IEEE Communications Letters, 7(1): 1-3, Jan. 2003.

Lipsey et al., "On the Teager-Kaiser Energy Operator "Low Frequency Error"," Midwest Symposium on Circuits and Systems, 53-56, Aug. 4, 2002.

Lohan et al., "Performance Analysis of an Efficient Multipath Delay Estimation Approach in a CDMA Multiuser Environment," IEEE International Symposium on Personal, Indoor and Mobile Radio Communications, A6-A10, Oct. 3, 2001.

Maragos et al., "Energy Separation in Signal Modulations with Application to Speech Analysis," IEEE Transactions on Signal Processing, 41(10): 3024-3051, Oct. 1, 1993.

Santhanam, "Multicomponent AM-FM Energy Demodulation with Applications to Signal Processing and Communications," Georgia Institute of Technology, pp. 1-165, Nov. 1997.

Santhanam et al., "Multicomponent AM-FM Demodulation via Periodicity-Based Algebraic Separation and Energy-Based Demodulation," IEEE Transactions on Communications, 48(3): 473-490, Mar. 2000.

* cited by examiner

METHOD AND APPARATUS FOR SUPPRESSING ADJACENT CHANNEL INTERFERENCE AND MULTIPATH PROPAGATION SIGNALS AND RADIO RECEIVER USING SAID APPARATUS

CROSS-REFERENCE TO RELATED APPLICATION

This application claims the benefit under 35 U.S.C. §120 of European Patent Application No. 06425683.7, filed on Oct. 6, 2006, and European Patent Application No. 06425686.0, filed on Oct. 6, 2006, which are incorporated herein by reference in their entireties.

BACKGROUND

1. Technical Field

The present invention refers to a method and an apparatus for suppressing the presence of multipath propagation in a broadcast signal.

The present invention moreover refers to a radio receiver using said apparatus.

The present invention refers to a method and an apparatus for detecting adjacent channel interference in a modulated digital signal.

The present invention moreover refers to a method and apparatus for suppressing adjacent channel interference in a modulated digital signal.

The present invention also refers to a radio receiver using said apparatus.

2. Description of the Related Art

In terrestrial broadcasting systems, the signals emitted from a transmission antenna often arrive to a reception antenna not only through a direct transmission antenna to reception antenna path, but also through many other paths.

Therefore, the reception antenna does not receive a single signal, but many signals.

This is due to the fact that the transmitted signal follows several different paths due to the reflections to which such signal is subjected. Indeed, during their propagation the transmitted signals are subjected to reflections which are caused by objects present in the broadcasting zone.

The signals which arise from such reflections are called multipath signals.

In reality, the signals received by the reception antenna reach in different times, are not in phase and do not have the same intensity, since the objects present in the broadcasting zone can be fixed in time and space, such as buildings, and/or can be movable, such as airplanes.

The signals, moreover, are combined with each other when they reach the reception antenna in a constructive or destructive manner, and the overall resulting effect is that the level of the input signal at the receiver varies considerably.

Essentially, the signal reaching the receiver is a combination of the source signal and the replicas of such source signal, each having different courses, delays and displacements.

There is hence the great need for suppressing the multipath propagation in the broadcast signal.

The effects of multipath propagation, therefore, must be at least theoretically suppressed or at least reduced during the demodulation process so to permit a correct reconstruction of the broadcast signal.

For example, the document US 2004/0042571 describes a system for suppressing the presence of multipath propagation in a broadcast signal.

Such system, even if certain advantageous features are present, nevertheless requires numerous circuit components and the implementation of specific software which is particular burdensome from the standpoint of computational complexity, with the consequence of having to employ high memory quantities.

Further examples of systems for suppressing the presence of multipath propagation in a broadcast signal are described in documents US 2005/0276365 and U.S. Pat. No. 7,221,925.

The problem of adjacent channel interference in broadcast signals is known, particularly in AM/FM signals. Adjacent channel interference is due to the presence of channels with high field intensity adjacent to the selected channel which one wishes to receive. In the present case, the radio waves of the adjacent channel are found to interfere with the radio waves of the desired broadcast channel, causing disturbances and/or distortions in the reception of the desired channel signal by an AM/FM radio receiver.

At the state of the art, various methods and apparatuses are known for detecting and reducing/suppressing the adjacent channel interference in a broadcast AM/FM signal.

In FM mode, the prior art provides the analysis of the radio signal in complex notation, centered on an intermediate frequency IF; the greater the detected displacement of the oscillation frequency of the carrier signal component, the greater the interference contribution of the undesired adjacent FM channel within the desired FM channel.

In the case of a signal of AM type, a prior art example provides, as in the case of an FM signal, the analysis of the broadcast signal DSB with dual side bands, it too centered on the intermediate frequency IF and a subsequent choice of the "cleanest" side band for the demodulation of the AM signal.

Other techniques require high performance hardware circuitry with a consequent increase in the costs of the apparatus for detecting and suppressing the adjacent channel interference, and consequently, in the overall cost of the AM/FM radio receiver in which such apparatus is incorporated.

Examples of additional techniques for detecting and reducing or suppressing the adjacent channel interference are described in the documents U.S. Pat. No. 6,430,724, US-2003/0207669 and WO-2004/047322.

Such documents describe methods and apparatuses which require numerous circuit components and complex processing algorithms for detecting and suppressing the adjacent channel interference in the received signal. Moreover, the methods and apparatuses therein described require a conversion of the received signal from the frequency of the selected carrier to an intermediate frequency IF, and hence the use of external mixers and filters for the intermediate frequency whose cost substantially impacts on the overall cost of the receiver.

BRIEF SUMMARY

One embodiment is a method and apparatus for suppressing the presence of multipath propagation in a broadcast signal which is free of the problems of the prior art as indicated above.

One embodiment is a receiver with a simple structure and with a reduced number of components which is capable of reducing at the same time the overall cost of the receiver.

One embodiment is a method for suppressing the presence of multipath propagation in a broadcast signal, in accordance with claim 1.

One embodiment is an apparatus for suppressing the presence of multipath propagation in a broadcast signal in accordance with claim 8.

One embodiment is a receiver provided with an apparatus for suppressing the presence of multipath propagation in a broadcast signal in accordance with claim 13.

One embodiment is a portable multimedia device provided with a receiver having the apparatus for suppressing the presence of multipath propagation in a broadcast signal in accordance with claim 14.

One embodiment is a computer product which, when loaded in the memory of a processor and running on such processor, permits actuating the method in accordance with the present invention.

Due to the present invention, it is possible to obtain a method and an apparatus capable of suppressing the presence of multipath propagation by using simpler instructions with respect to the prior art.

Moreover, it is possible to obtain an apparatus capable of suppressing the presence of multipath propagation in order to reconstruct the originally transmitted signal free of multipath noise, employing a lower number of components and smaller-size memory elements.

A further advantageous feature is that of obtaining a radio receiver equipped with the apparatus for suppressing the presence of multipath propagation whose cost of production and achievement is considerably less with respect to the prior art radio receivers.

One embodiment is a method and an apparatus for detecting adjacent channel interference in a modulated digital signal that is capable of overcoming the drawbacks present in the prior art.

One embodiment is a method and apparatus for suppressing adjacent channel interference.

One embodiment is a method for detecting adjacent channel interference in accordance with claim 1 and a method for suppressing adjacent channel interference in accordance with claim 14.

One embodiment is an apparatus for detecting adjacent channel interference in accordance with claim 15 and an apparatus for suppressing adjacent channel interference in accordance with claim 29.

One embodiment is a receiver provided with an apparatus for detecting adjacent channel interference in accordance with claim 30 and an apparatus for suppressing adjacent channel interference in accordance with claim 31.

One embodiment is a portable multimedia device provided with a receiver having the apparatus for suppressing adjacent channel interference in a modulated digital signal in accordance with claim 32.

One embodiment is a computer product which, loaded in the memory of a processor and running on such processor, permits carrying out a method in accordance with claim 33.

Due to the present invention, it is possible to obtain a method and an apparatus capable of detecting the adjacent channel interference in a modulated digital signal by using a simpler technique with respect to those employed at the state of the art, and suppressing or at least greatly reducing such adjacent channel interference in the modulated digital signal.

Moreover, it is possible to obtain an apparatus capable of detecting and suppressing or at least greatly reducing the adjacent channel interference in a modulated digital signal.

A further advantageous aspect is that of obtaining a radio receiver equipped with the apparatus for detecting and suppressing or reducing the adjacent channel interference whose production and achievement cost is considerably less than that of radio receivers of the prior art.

BRIEF DESCRIPTION OF THE SEVERAL VIEWS OF THE DRAWINGS

The characteristics and advantages of the present invention will be evident from the following detailed description of a practical embodiment, illustrated as a non-limiting example in the drawings, in which.

DETAILED DESCRIPTION

Suppressing Multipath Propagation

Figure 1:
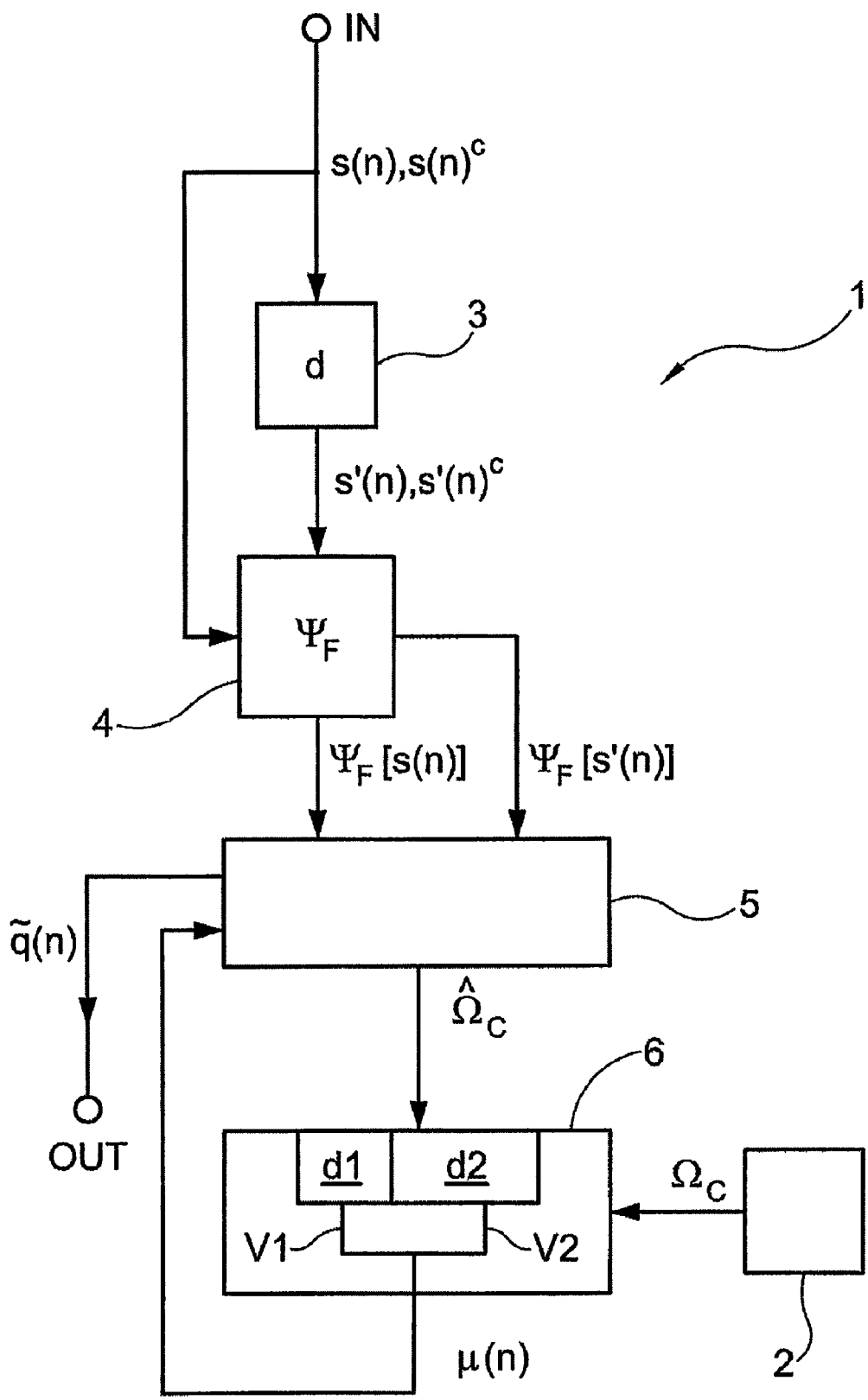
FIG. 1 shows an explanatory diagram of the method and apparatus 1 for suppressing the presence of multipath propagation in a broadcast signal, in accordance with the present invention.

With reference to FIG. 1, in which the explanatory diagram of the method and apparatus 1 for suppressing the presence of multipath propagation in a received signal $s(n)$, $s(n)^c$ is shown, it is noted that such apparatus 1 comprises an input terminal IN and an output terminal OUT, which are respectively associable to a front end and a back end of a receiver (not illustrated in the figure), as described in more detail below.

It should be indicated that in such FIG. 1, only the elements necessary for understanding the operation and achievement of the embodiment are illustrated. The person skilled in the art will be capable of understanding which other elements are necessary, how to design, implement and connect them with the other elements in order to make a complete diagram of a receiver.

Before proceeding with the description, it should be underlined that the signal $s(n)$, $s(n)^c$ received from the receiver is an FM modulated digital signal corrupted by the presence of time-varying multipath propagation, whose representation can be obtained by assuming that:

the transmitted digital signal $x(n)$ is a modulated digital signal composed of a carrier signal oscillating at a carrier frequency $f_c$, and a modulating signal which is generically expressible with the following formula:

$$x(n)=a(n)\cdot\cos(\Omega_c \cdot n+\Omega_m \cdot \int_0^n q(v)\cdot dv+\phi)$$

where $a(n)$ represents the AM modulating signal component with time varying envelope $|a(n)|$, $\vartheta(n)=\Omega_c+\Omega_m \cdot q(n)$ represents the instantaneous angular frequency, $q(n)$ the FM modulating signal component where $|q(n)| \leq \forall n \; \epsilon\{I \geq 0\}$ $0 \leq \Omega_c \pm \Omega_m \leq \pi$, $\Omega_m$ is the angular frequency deviation, $\Omega_c$ is the angular frequency of the carrier signal and "n" the number of samples of the transmitted digital signal;

the signal $s(n)$, $s(n)^c$ is a combination of the source signal $x(n)$ and replicas of this source signal $x_0(n)$, $x_1(n)$, $x_2(n)$, $x_i(n)$ etc. each having different courses, delays and displacements, which is expressible with the following Cartesian notation:

$$s(n) = \left(r_0 + \sum_{i=1}^{N} r_i \cdot e^{-j \cdot (\Omega_c \cdot n \cdot \tau_1 + \Omega_c \cdot \chi_1)}\right) \cdot a(n) \cdot \cos\left(\Omega_c \cdot n + \Omega_m \cdot \int_0^n q(v) \cdot dv + \phi\right)$$

or, using the complex notation, by means of the following formula:

$$s(n)^C = \left(r_0 + \sum_{i=1}^{N} r_i \cdot e^{-j \cdot (\Omega_c \cdot n \cdot \tau_1 + \Omega_c \cdot \chi_1)}\right) \cdot a(n) \cdot e^{j \cdot (\Omega_c \cdot n + \Omega_m \cdot \int_0^n q(v) dv + \phi)}$$

where:
$r_0$ represents the attenuation of the transmitted signal $x_0(n)$,
$r_i$ represents the attenuation of the ith transmitted signal $x_i(n)$,
$\chi_i$ represents the spatial delay, related to the larger/smaller path with respect to the main path which the ith transmitted signal $x_i(n)$ underwent, and
$\tau_i$ the time delay—assuming that the delay of the signal on the main path is null—of the ith transmitted signal $x_i(n)$.

It should be pointed out that, in the course of the present description, use will be made of the non-linear Teager-Kaiser operator (or function) which is, for example, described in the document "On a Simple Algorithm to Calculate the Energy of a Signal," by James F. Kaiser, PROC. ICASSP, Vol. S7.3, pps. 381-384, 1990, incorporated herein by reference.

The non-linear Teager-Kaiser operator is therefore an algorithm capable of calculating the "energy" of a signal.

Such algorithm therefore produces, as a result of its processing, a value which has been shown to be directly correlated to the "energy" of the signal being analyzed.

The definition of non-linear Teager-Kaiser operator is illustrated below in order to make the subsequent description of the invention clearer.

The non-linear Teager-Kaiser operator is defined by the following relation (1):

$$\Psi[x(n \cdot T)] = \left(\frac{\partial}{\partial (n \cdot T)} x(n \cdot T)\right)^2 - x(n \cdot T) \cdot \left(\frac{\partial^2}{\partial (n \cdot T)^2} x(n \cdot T)\right)$$

where $x(nT)$ represents a discrete time-varying signal defined by a plurality of samples.

Using the general property of the derivatives in the discrete domain and maintaining the coherence between the samples with the primitive function and its derivatives, it is possible to obtain, by removing the notion of the time T, that:

$$\overset{\circ}{x}(n) = \frac{x(n+1) - x(n-1)}{2}$$

or $$\overset{\circ}{x}(n) = x(n+1) - x(n)$$

and $$\overset{\circ\circ}{x}(n) = x(n+1) + x(n-1) - 2 \cdot x(n)$$

thus to be able to rewrite (1) in the more compact forms, illustrated below (2):

$$\Psi[x(n)] = [x(n+1) - x(n)]^2 - x(n+1) \cdot [x(n+1) + x(n-1) - 2 \cdot x(n)] \quad (3)$$

or $$\Psi[x(n)] = [x(n)]^2 - x(n+1) \cdot x(n-1)$$

That stated, the method in accordance with one embodiment for suppressing the presence of multipath propagation in the modulated digital signal $s(n)$, $s(n)^c$, comprises the steps of:
providing at least one first value $\Omega_c$ of channel angular frequency, representative of said modulated digital signal $s(n)$, $s(n)^c$ free of multipath propagation,
providing at least one second value $\hat{\Omega}_c$ of said channel angular frequency, representative of said modulated digital signal $s(n)$, $s(n)^c$,
comparing said at least one first value $\Omega_c$ with said at least one second value $\hat{\Omega}_c$ thus to detect the presence of multipath propagation in said modulated digital signal $s(n)$, $s(n)^c$.

In particular, the step of generating said at least one second value $\hat{\Omega}_c$ comprises the steps of:
processing said modulated digital signal $s(n)$, $s(n)^c$ to obtain a derivative signal $s'(n)$, $s'(n)^c$ representative of the derivative of said digital signal $s(n)$, $s(n)^c$,
applying a non-linear Teager-Kaiser function $\Psi$ to said modulated digital signal $s(n)$, $s(n)^c$ to generate a first signal $\Psi[s(n), s(n)^c]$ representative of the energy of said digital signal $s(n)$, $s(n)^c$,
applying said non-linear Teager-Kaiser function $\Psi$ to said derivative signal $s'(n)$, $s'(n)^c$ to generate a second signal $\Psi[s'(n), s'(n)^c]$ representative of the energy of said derivative signal $s'(n)$,
processing said first signal $\Psi[s(n), s(n)^c]$ and said second signal $\Psi[s'(n), s'(n)^c]$ to generate said at least one second value $\hat{\Omega}_c$.

The comparing step also comprises the step of calculating the ratio between said at least one second value $\hat{\Omega}_c$ and said at least one first value $\Omega_c$, said ratio identifying a parameter $\mu(n)$ capable of detecting the presence of multipath propagation in said modulated digital signal $s(n)$, $s(n)^c$ when said calculated ratio is less than 1.

The parameter $\mu(n)$, also called multipath coefficient, indicates the quantity of the multipath contribution present in the antenna signal.

In particular, the parameter $\mu(n)$ is calculated in accordance with the following formula (4):

$$\mu(n) = \frac{1 - \cos(2 \cdot \hat{\Omega}_c)}{1 - \cos(2 \cdot \Omega_c)}$$

where:
said second value $\hat{\Omega}_c$ is calculated by applying the following formula (5):

$$\hat{\Omega}_c = \frac{1}{N} \cdot \sum_{n=1}^{N} \frac{1}{2} \cdot \arccos\left(1 - \frac{\Psi_F[s(n+1) - s(n-1)]}{2 \cdot \Psi_F[s(n)]}\right)$$

N being the number of samples to be analyzed, $\Psi[s(n)]$ corresponds to the non-linear function of said first signal $s(n), s(n)^c$, and $$\frac{1}{2} \cdot \Psi[s(n+1) - s(n-1)] \qquad 5$$

corresponds to said second signal $s'(n)$, $s'(n)^c$;

$\Omega_c$ is the channel angular frequency, which is known since it is set by the user in the reception step.

It should be indicated that, in the absence of multipath, the parameter $\mu(n)$ is equal to one.

In formula (5), for the calculation of the second value $\hat{\Omega}_c$, only the Cartesian notation of the signal received at the receiver (i.e. $s(n)$) was used for exposure simplicity, but the complex notation (i.e. $s(n)^c$) could also be used to obtain analogous results.

To calculate the second value $\hat{\Omega}_c$, one first establishes the value of the number N of samples to be analyzed, a value which varies as a function of the precision $f_{prec}$ with which it is desired to calculated the value of the carrier frequency $f_c$, where $$f_{prec} \leq \frac{2 f_m}{\Omega_q N}$$

From the above expressions, it is obtained that the number of samples N satisfies the relation:

$$N \leq \frac{2 f_m}{\Omega_q f_{prec}}$$

in which:

$f_m$ is known and is equal to the frequency deviation of the modulating signal in an FM transmission, typically equal to 75 KHz, $\Omega_q$ is known and is equal to the angular bandwidth of the FM modulating signal in an FM transmission, typically equal to 15 KHz, $f_{prec}$ is set by the user.

In other words, the parameter $\mu(n)$ is used, by means of the processing step of said first signal $\Psi[s(n)]$ and said second signal $\Psi[s'(n)]$, in the extraction calculation of a first "non-equalized" signal $\hat{q}(n)$ representative of the waveform of said modulating signal $q(n)$ by applying the following formula (6):

$$\hat{q}(n) \cong \frac{1}{2 \cdot \Omega_m} \cdot \arccos\left\{\mu(n) \cdot \left[\frac{1 - \mu(n)}{\mu(n)} + \cos(2 \cdot \Omega_c + 2 \cdot \Omega_m \cdot q(n))\right]\right\} - \frac{\Omega_c}{\Omega_m}$$

where:

$\Omega_c$ is said first value which corresponds to the supplied angular frequency which is known since it is, for example, set by the user in the reception step;

$\mu(n)$ is the multipath coefficient;

$q(n) \cdot \Omega_m$ is the ideal signal representative of the waveform of said modulating signal $q(n)$.

It should be said that the method, in addition to identifying the presence of multipath propagation by means of the processing of the multipath coefficient $\mu(n)$, is also capable of processing the first non-equalized signal $\hat{q}(n)$.

Nevertheless, such first non-equalized signal $\hat{q}(n)$ is a non-usable signal in the back end of the receiver since it is affected by multipath propagation.

In order to obtain a usable signal in the back end of the receiver, the multipath coefficient $\mu(n)$ is advantageously used to generate a second equalized signal $\tilde{q}(n)$ representative of the waveform of said modulating signal $q(n)$ by applying the following formula (7):

$$\tilde{q}(n) \cong \frac{1}{2 \cdot \Omega_m} \cdot \arccos_\mu[1 - \mu(n) + \mu(n) \cdot \cos(2 \cdot \Omega_c + 2 \cdot \Omega_m \cdot q(n))] - \frac{\Omega_c}{\Omega_m}$$

where $\Omega_c$ is said first value which corresponds to the angular frequency of supplied carrier frequency ($f_c$);

$\mu(n)$ is the multipath coefficient;

$\arccos_\mu$ is the modified arc cosine, which depends on the value of $\mu(n)$ and which solves the equation $\alpha = \arccos_\mu (1 - \mu + \mu \cdot \cos \alpha)$;

$q(n) \cdot \Omega_m$ is said ideal signal representative of the waveform of said modulating signal $q(n)$.

The method, therefore, in addition to permitting identifying the presence of multipath propagation, by processing the parameter $\mu(n)$, is also capable of processing such second equalized signal $\tilde{q}(n)$, which is a signal usable in the back end of the receiver.

Advantageously, the back end of the receiver receives said second equalized signal $\tilde{q}(n)$, in which the multipath propagation present in the received signal $s(n)$, $s(n)^c$ was substantially suppressed or drastically reduced.

In other words, said second equalized signal $\tilde{q}(n)$ is the "non-equalized" version of said first signal $\hat{q}(n)$ after the compensation has been executed of the presence of multipath propagation in said modulated digital signal $s(n), s(n)^c$.

In order to determine $\tilde{q}(n)$, it is sufficient to substitute the arccos function in the canonical extraction formula of frequency modulating signal (see formula (63) of the document "P. Maragos, J. F. Kaiser and T. F. Quatieri, "Energy Separation in Signal Modulations with Application to Speech Analysis", *IEEE Trans. on Signal Proc.*, 41 (10): 3025-3051, October 1993") with the $\arccos_\mu$ function as in the following formula (8):

$$\tilde{q}(n) \cdot \Omega_m \cong \frac{1}{2} \cdot \arccos_\mu\left(1 - \frac{\Psi[s(n+1) - s(n-1)]}{2 \cdot \Psi[s(n)]}\right) - \Omega_c$$

where:

$\Psi[s(n)]$ corresponds to said first signal, $$\frac{1}{2} \cdot \Psi[s(n+1) - s(n-1)]$$

corresponds to said second signal $\Psi[s'(n)]$ $\Omega_c$ is said first value which corresponds to the angular frequency of supplied carrier frequency ($f_c$).

To support the result obtained with the above described method, the passages will be illustrated below for reaching the definition of the parameter $\mu(n)$, or:

$$\mu(n) = \frac{1 - \cos(2 \cdot \hat{\Omega}_c)}{1 - \cos(2 \cdot \Omega_c)}$$

Using, for example, the complex notation of the received modulated digital signal $s(n)^c$ described above, and applying the non-linear Teager-Kaiser function $\Psi$ to such modulated digital signal $s(n)^c$ and setting $\chi_0 = 0$ and $\tau_0 = 0$, one obtains that:

$$\Psi[s(n)^c] = \left[\left(r_0 + \sum_{i=1}^{N} r_i \cdot e^{-j \cdot (\Omega_c \cdot n \cdot \tau_1 + \Omega_c \cdot \chi_1)}\right) \cdot a(n) \cdot e^{j \cdot (\Omega_c \cdot n + \Omega_m \cdot \int_0^\pi q(v) \cdot dv + \phi)}\right]$$

$$\approx 2 \cdot a^2(n) \cdot \left[\begin{array}{c} \sum_{i=0}^{N} r_i^2 \cdot \sin^2(\Omega_c + \Omega_m \cdot q(n) - \Omega_c \cdot \tau_i) + \\ \sum_{\substack{i,k=0 \\ i \neq k}}^{N} 2 \cdot r_i \cdot r_k \cdot \cos[\Omega_c \cdot n \cdot (\tau_i - \tau_k) + \Omega_c \cdot (\chi_i - \chi_k)] \cdot \\ \sin^2\left(\Omega_c + \Omega_m \cdot q(n) - \frac{\Omega_c \cdot (\tau_i - \tau_k)}{2}\right) \end{array}\right]$$

Such expression demonstrates that the energy of the modulated digital signal $s(n)^c$ is a linear combination of the energy of the replicas $x_0(n)$, $x_1(n)$, $x_2(n)$, $x_i(n)$, etc. of the source signal $x(n)$ following the reflections, attenuations and delays of each signal $x_0(n)$, $x_1(n)$, $x_2(n)$, $x_i(n)$, etc.

In order to determine the quality of the signal in the presence of multipath, one first executes the derivative of the modulated digital signal $s(n)^c$ by obtaining the derivative signal $s'(n)^c$ and subsequently applying the non-linear function Teager-Kaiser $\Psi$ to such derivative digital signal $s'(n)^c$ by setting $\chi_0 = 0$ and $\tau_0 = 0$. It is therefore obtained that:

$$\Psi\left[\frac{\partial}{\partial n}s(n)^c\right] = \left[\frac{\partial}{\partial n}(r_0 + e^{-j(\Omega_c \cdot n \cdot \tau_1 + \Omega_c \cdot \chi_1)}) \cdot a(n) \cdot e^{j(\Omega_c \cdot n + \Omega_m \cdot \int_0^n q(v) \, dv + \phi)}\right] \approx$$

$$2 \cdot a^2(n) \cdot \left[\sum_{i=0}^{N} r_i^2 \cdot \sin^4(\Omega_c + \Omega_m \cdot q(n) - \Omega_c \cdot \tau_i) + \sum_{\substack{i,k=0 \\ i \neq k}}^{N} 2 \cdot r_i \cdot r_k \cdot \cos[\Omega_c \cdot n \cdot (\tau_i - \tau_k) + \Omega_c \cdot (\chi_i - \chi_k)] \cdot \sin^4\left(\Omega_c + \Omega_m \cdot q(n) - \frac{\Omega_c \cdot (\tau_i - \tau_k)}{2}\right)\right]$$

In view of the fact that the baseband signal $q(n)$ is given by the relation reported below:

$$q(n) \cdot \Omega_m \cong \frac{1}{2} \cdot \arccos\left(1 - \frac{\Psi[s(n+1) - s(n-1)]}{2 \cdot \Psi[s(n)]}\right) - \Omega_c$$

where $\Psi[s(n)]$ corresponds to $\Psi[s(n)^c]$ and $$\frac{1}{2} \cdot \Psi[s(n+1)^c - s(n-1)^c]$$

corresponds to $\Psi[s'(n)^c]$, one has, by substituting the previously calculated values of $\Psi[s(n)^c]$ and $\Psi[s'(n)^c]$, the following expression of the signal in baseband, or rather the previously given definition (6) of said first "non-equalized" signal $\hat{q}(n)$, representative of the waveform of said modulating signal $q(n)$:

$$\hat{q}(n) \cong \frac{1}{2 \cdot \Omega_m} \cdot \arccos\left\{\mu(n) \cdot \left[\frac{1 - \mu(n)}{\mu(n)} + \cos(2 \cdot \Omega_c + 2 \cdot \Omega_m \cdot q(n))\right]\right\} - \frac{\Omega_c}{\Omega_m}$$

where $\mu(n)$ is the multipath coefficient and is defined by the following relation (9):

The previously defined expression (9) of the multipath coefficient $\mu(n)$ can be simplified if the signal $\hat{q}(n)$ is possibly decimated.

In such case, the crossed terms give a very small contribution to the signal energy, the average being close to zero.

In such case, the parameter $\mu(n)$ can therefore be rewritten as (10):

$$\mu(n) = \frac{\sum_{i=0}^{N} r_i^2 \cdot \frac{\sin^4(\Omega_c + \Omega_m \cdot q(n) - \Omega_c \cdot \tau_i)}{\sin^4(\Omega_c + \Omega_m \cdot q(n))}}{\sum_{i=0}^{N} r_i^2 \cdot \frac{\sin^2(\Omega_c + \Omega_m \cdot q(n) - \Omega_c \cdot \tau_i)}{\sin^2(\Omega_c + \Omega_m \cdot q(n))}}$$

Using the trigonometric formula in accordance to which $$\frac{\sin(a - e)}{\sin a} = \cos e - \sin e \cdot \cot a$$

and using a sampling frequency f such to obtain a carrier angular frequency equal to:

$$\Omega_c = (2 \cdot k + 1) \cdot \frac{\pi}{2} \quad \forall k \in \mathfrak{J} \geq 0$$

The parameter $\mu(n)$ can therefore be rewritten as (11):

$$\mu(n) = \frac{\sum_{i=0}^{N} r_i^2 \cdot \cos^4(\Omega_c \cdot \tau_i)}{\sum_{i=0}^{N} r_i^2 \cdot \cos^2(\Omega_c \cdot \tau_i)} \equiv \frac{1 + \frac{1}{r_0^2} \cdot \sum_{i=1}^{N} r_i^2 \cdot \cos^4(\Omega_c \cdot \tau_i)}{1 + \frac{1}{r_0^2} \cdot \sum_{i=1}^{N} r_i^2 \cdot \cos^2(\Omega_c \cdot \tau_i)} \in \mathfrak{R} \, \{0 \ldots 1\}$$

In order to minimize the expression (11), assuming use in the worst operation case, tone can place all attenuation values equal to one. In such case, $\mu(n)$ assumes a minimum value, as can be inferred by the subsequently reported Table 1, at an angular value equal to:

$$\Omega_c \cdot \tau_i = \arccos\sqrt{\frac{\sqrt{1 + \overline{N}} - 1}{\overline{N}}}$$

where $\overline{N}$ is the number of path reflections.

$$\mu(n) = \frac{\sum_{i=0}^{N} r_i^2 \cdot \frac{\sin^4(\Omega_c + \Omega_m \cdot q(n) - \Omega_c \cdot \tau_i)}{\sin^4(\Omega_c + \Omega_m \cdot q(n))} + \sum_{\substack{i,k=0 \\ i \neq k}}^{N} 2 \cdot r_i \cdot r_k \cdot \cos[\Omega_c \cdot n \cdot (\tau_i - \tau_k) + \Omega_c \cdot (\chi_i - \chi_k)] \cdot \frac{\sin^4\left(\Omega_c + \Omega_m \cdot q(n) - \frac{\Omega_c \cdot (\tau_i - \tau_k)}{2}\right)}{\sin^4(\Omega_c + \Omega_m \cdot q(n))}}{\sum_{i=0}^{N} r_i^2 \cdot \frac{\sin^2(\Omega_c + \Omega_m \cdot q(n) - \Omega_c \cdot \tau_i)}{\lfloor \sin^2(\Omega_c + \Omega_m \cdot q(n)) \rfloor} + \sum_{\substack{i,k=0 \\ i \neq k}}^{N} 2 \cdot r_i \cdot r_k \cdot \cos[\Omega_c \cdot n \cdot (\tau_i - \tau_k) + \Omega_c \cdot (\chi_i - \chi_k)] \cdot \frac{\sin^2\left(\Omega_c + \Omega_m \cdot q(n) - \frac{\Omega_c \cdot (\tau_i - \tau_k)}{2}\right)}{\sin^2(\Omega_c + \Omega_m \cdot q(n))}}$$

TABLE I

| N | μ(n) Minimum value | $\Omega_c \cdot \tau_i$ |
|---|---|---|
| 1 | 0.828428 | ~5π/18 |
| 2 | 0.732051 | ~22π/75 |
| 3 | 0.666667 | ~24π/79 |
| 4 | 0.618034 | ~5π/16 |
| 5 | 0.579796 | 22π/69 |
| 6 | 0.548584 | 12π/37 |
| 7 | 0.522408 | 28π/85 |
| 8 | 0.500000 | π/3 |
| 9 | 0.480508 | 29π/86 |
| 10 | 0.463359 | 20π/59 |

To equalize the received signal $s(n)$, $s(n)^c$, it is possible to estimate the parameter value $\mu(n)$ and subsequently extract the received signal $s(n)$, $s(n)^c$ by using a special "arccos$_\mu$" function.

Such arccos$_\mu$ is a function which recursively depends on the value of $\mu(n)$, for example of the type $\alpha=\mathrm{arccos}_\mu(1-\mu+\mu^*\cos\alpha)$.

Considering that the relation (6) can be rewritten in the manner illustrated here (12):

$$2\cdot\hat{\Omega}_c+2\cdot\hat{\Omega}_m\cdot\hat{q}(n)\cong\mathrm{arccos}\,[1-\mu(n)+\mu(n)\cdot\cos(2\cdot\Omega_c+2\cdot\Omega_m\cdot q(n))]$$

and that the relation (12), assuming operation on the sample average, can be rewritten in accordance with the following relation (13):

$$2\cdot\hat{\Omega}_c\cong\langle\mathrm{arccos}\,[1-\mu(n)+\mu(n)\cdot\cos(2\cdot\Omega_c+2\cdot\Omega_m\cdot q(n))]\rangle_{average}$$

and that the relation (8) can be rewritten, assuming operation on the sample average, in accordance with the following relation (14):

$$2\cdot\Omega_c\cong\langle\mathrm{arccos}\,[\cos(2\cdot\Omega_c+2\cdot\Omega_m\cdot q(n))]\rangle_{average}$$

by substituting such expressions (13) and (14) in the expression (11), the parameter expression $\mu(n)$ is obtained, or rather:

$$\mu(n)=\frac{1-\cos(2\cdot\hat{\Omega}_c)}{1-\cos(2\cdot\Omega_c)}$$

Therefore, the signal which must be subsequently processed in the back end of the receiver is that which is formulated here below:

$$\tilde{q}(n)\approx\frac{1}{2\cdot\Omega_m}\cdot\mathrm{arccos}_\mu[1-\mu(n)+\mu(n)\cdot\cos(2\cdot\Omega_c+2\cdot\Omega_m\cdot q(n))]-\frac{\Omega_c}{\Omega_m}$$

that is the previously given definition (7) of said second equalized signal $\tilde{q}(n)$, representative of the waveform of said modulating signal $q(n)$.

In other words, the method permits identifying the presence of multipath propagation, processing the parameter $\mu(n)$ and processing said second equalized signal $\tilde{q}(n)$ due to which the multipath propagation present in the received signal $s(n)$, $s(n)^c$ is substantially eliminated.

The method for detecting the multipath propagation in the modulated digital signal $s(n)$, $s(n)^c$ just illustrated can be achieved in either software or hardware mode.

With reference now to FIG. 1, an apparatus 1 for implementing such method for suppressing the presence of multipath propagation in the modulated digital signal $s(n)$, $s(n)^c$ comprises:

means 2 for providing a predetermined channel frequency value $\Omega_c$;

derivation means 3 able to receive said digital signal $s(n)$, $s(n)^c$ in input to generate a derivative signal $s'(n),s'(n)^c$ representative of the derivative of said digital signal $s(n)$, $s(n)^c$, processing means 4 able to receive said digital signal $s(n)$, $s(n)^c$ and said derivative signal $s'(n),s'(n)^c$ in input, so to apply a non-linear Teager-Kaiser function $\Psi$ to said digital signal $s(n)$, $s(n)^c$ to generate a first signal $\Psi[s(n),s(n)^c]$ representative of the energy of said digital signal $s(n)$, $s(n)^c$, and to said derivative signal $s'(n),s'(n)^c$ to generate a second signal $\Psi[s'(n),s'(n)^c]$ representative of the energy of the derivative $s'(n),s'(n)^c$ of said digital signal $s(n)$, $s(n)^c$, second processing means 5 for processing said first signal $\Psi[s(n),s(n)^c]$ and said second signal $\Psi[s'(n),s'(n)^c]$ to generate a representative value of a processed channel angular frequency $\hat{\Omega}_c$ of said modulated digital signal $s(n)$, $s(n)^c$, comparison means 6 able to receive in input said predetermined channel angular frequency value $\Omega_c$ and said representative value of a processed channel angular frequency $\hat{\Omega}_c$ to compare said predetermined channel angular frequency value $\Omega_c$ and said representative value of a processed channel angular frequency $\hat{\Omega}_c$ so to generate a parameter $\mu(n)$ able to detect the presence of multipath propagation in said modulated digital signal $s(n)$, $s(n)^c$.

In particular, the comparison means 6 comprise:

a first device d1 having in input said representative value of a processed channel angular frequency $\hat{\Omega}_c$ for calculating a first value v1, said first value v1 being calculable by means of the following relation:

$$v1=1-\cos(2^*(\hat{\Omega}_c))$$

where v1 is said first calculated value $\hat{\Omega}_c$ is a value which corresponds to the angular frequency of processed carrier frequency;

a second device d2 having in input said predetermined channel frequency value $\Omega_c$ for calculating a second value v2, said second value v2 being calculable by means of the following relation:

$$v2=1-\cos(2^*(\Omega_c))$$

where v2 is said second calculated value $\Omega_c$ corresponds to the angular frequency of carrier frequency ($f_c$).

It should be indicated that said comparison means 6 are capable of calculating the ratio between said first value v1 and said second value v2 to generate the parameter $\mu(n)$, thus to detect the presence of multipath propagation in said modulated digital signal $s(n)$, $s(n)^c$.

In particular, the comparison means 6 execute the ratio between said first value v1 and said second value v2, that is (4):

$$\mu(n)=\frac{v1}{v2}$$

Once the comparison means 6 have generated the parameter $\mu(n)$, this can be used by the processing means 5 for processing said first signal $\Psi[s(n),s(n)^c]$ and said second signal $\Psi[s'(n),s'(n)^c]$ for generating the equalized signal $\tilde{q}(n)$.

As described above, the equalized signal q̃(n), representative of the waveform of said modulating signal (q(n)), is calculable by applying the following formula (7):

$$\tilde{q}(n) \approx \frac{1}{2 \cdot \Omega_m} \cdot \arccos_\mu[1 - \mu(n) + \mu(n) \cdot \cos(2 \cdot \Omega_c + 2 \cdot \Omega_m \cdot q(n))] - \frac{\Omega_c}{\Omega_m}$$

where
$\Omega_c$ corresponds with the angular frequency of carrier frequency $f_c$;
$\mu(n)$ is the ratio between said representative value of a processed channel frequency $\hat{\Omega}_c$ and said predetermined channel frequency value $\Omega_c$;
$\arccos_\mu$ is a function which depends on the value of $\mu(n)$;
$q(n)*\Omega_m$ is said ideal signal representative of the waveform of said modulating signal q(n).

As previously shown for obtaining the equalized signal q̃(n), the processing means 5 process said first signal $\Psi[s(n), s(n)^c]$ and said second signal $\Psi[s'(n), s'(n)^c]$ by applying the following formula:

$$\tilde{q}(n) \cdot \Omega_m \cong \frac{1}{2} \cdot \arccos_\mu\left(1 - \frac{\Psi[s(n+1) - s(n-1)]}{2 \cdot \Psi[s(n)]}\right) - \Omega_c$$

where
$\Psi[s(n)]$ corresponds with said first signal,
$\Psi[s(n+1)-s(n-1)]$ corresponds with said second signal,
$\Omega_c$ corresponds with the angular frequency of carrier frequency $f_c$,
$\arccos_\mu$ is a function which depends on the value of $\mu(n)$.

In a preferred embodiment, the derivation means 3, the processing means 4, the second processing means and the comparison means 6 can be implemented in a single device, such as for example a DSP (digital signal processor).

In particular, the receiver obtainable is capable of receiving a modulated analog signal s(t) in input and converting it to a modulated digital signal s(n), s(n)$^c$ using an appropriate analog-digital converter (not shown in the figures).

Figure 2:
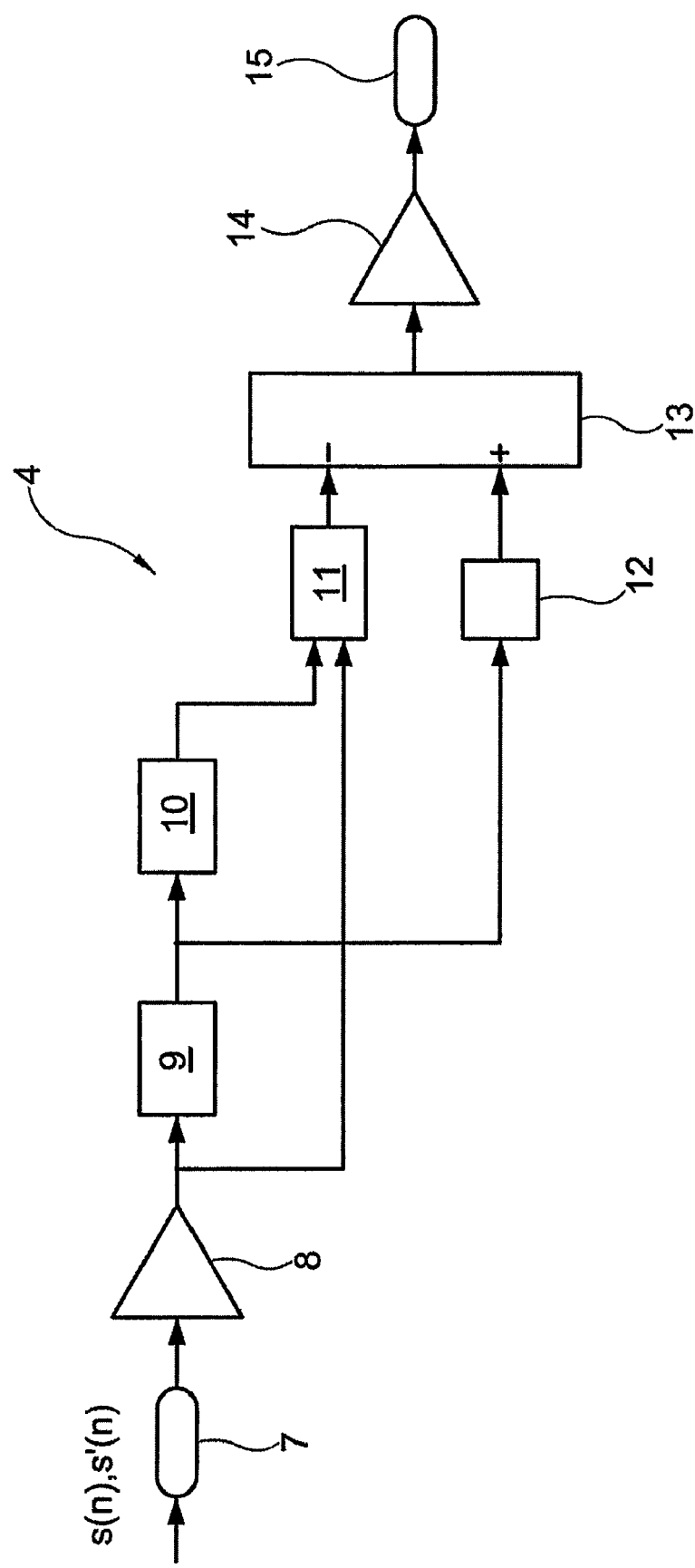
FIG. 2 shows a block diagram of a possible embodiment of a circuit of the apparatus illustrated in FIG. 1.

In FIG. 2 a possible embodiment is illustrated of the processing means 4 for implementing the non-linear Teager-Kaiser function.

Such processing means 4 comprise an input 7 able to receive the signal s(n) or the derivative signal s'(n), preferably but not necessarily a pre-amplification stage 8 for amplifying the signal s(n), a first delay block 9 and a second delay block 10.

The first delay block 9 is connected to the input 7 and is able to delay the input signal s(n) by one sample, while the second delay block 10 is input connected to the output of the first delay block 9 and is able to delay the signal output from the first delay block 9 by one sample.

The means 4 comprise a multiplier 11 connected to the input 7 and to the output of the second delay block 10 for multiplying the signal s(n) at the input 7 and the signal at the output of the second delay block 10 and a block 12 which squares the signal output from the first delay block 9.

Moreover, an adder block 13 is present having a positive input connected to the output of the block 12 and a negative input connected to the output of the multiplier block 11.

Preferably but not necessarily, the means 4 comprise a post-amplification stage 14 for amplifying the signal output from the adder block 13 and an output 15 from which the first signal $\Psi[s(n), s(n)^c]$ and said second signal $\Psi[s'(n), s'(n)^c]$ are drawn.

In the case in which, the sample s(n−1) of the signal s(n) is present at the input 7 of the circuit, the signal at the output 15 is represented by the expression reported here below:

$$[s(n)]^2 - s(n+1) \cdot s(n-1)$$

that is the Teager Kaiser function $\Psi[s(n)]$ of the modulated digital signal s(n).

Figure 8:
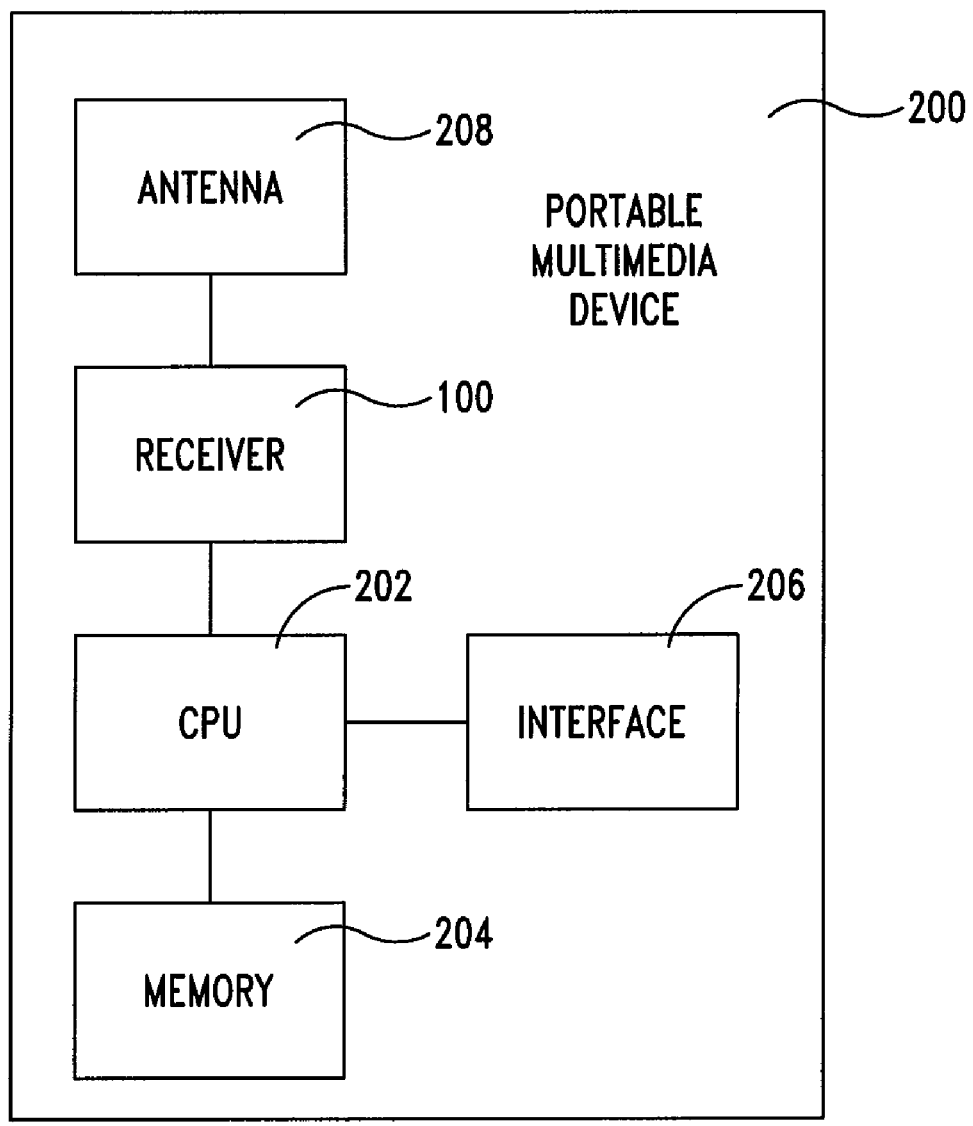
FIG. 8 shows a block diagram of a portable multimedia device

The apparatus 1 for suppressing the presence of multipath propagation in the modulated digital signal s(n), s(n)$^c$ can be implemented in a receiver (such as the receiver of FIG. 6), which can also be inserted in a portable multimedia device (such as the portable multimedia device shown in FIG. 8).

For example, the portable multimedia device comprises a central unit and a plurality of circuits, said central unit being able to control the operation of said plurality of circuits, and said plurality of circuits comprising at least one interface chosen from among the group comprising a video interface, a keyboard interface, a communication interface, a pen input interface, an audio interface or a combination of these.

For example, the portable multimedia device described above can be a cellular telephone equipped with a digital media player, of MP3 player type and/or MP4 player type and/or WMV player Digital type.

Adjacent Channel Interference

It should be pointed out that the digital signal x(n), derived from the corresponding analog signal x(t), is an ideal signal, free of adjacent channel interference.

Nevertheless, in a real communication system, noise or adjacent channel interference can be present, such interference being capable of degrading the information content of the received signal and reducing its quality. Such analog signal affected by adjacent channel interference will be indicated below in the present description with the s(t) notation, as the s(n) notation will indicate the corresponding digital signal.

As is known, a receiver, for example a car radio receiver, is capable of receiving a radio frequency modulated analog signal s(t), which can be an AM modulated signal or an FM modulated signal, filtering it, converting it into a digital signal s(n) using an analog-digital converter having a sampling frequency $f_s$, and processing such digital signal in order to demodulate the received modulated signal s(t). If the adjacent channel interference, present in the modulated analog signal s(t), and hence in the corresponding modulated digital signal s(n), is particularly high, such interference is capable of degrading the quality of the output audio signal to an unacceptable level.

With reference to the attached figures, a method for detecting the adjacent channel interference in a modulated digital signal s(n) comprises the steps of:

a) providing at least one first value of a characteristic parameter of the digital signal s(n), in the example the value $a_f(n)$, if the signal s(n) is an FM signal, and the value $\Omega_c$ if the signal s(n) is an AM signal, such first value being representative of the modulated digital signal s(n) free of adjacent channel interference, b) providing at least one second value of such characteristic parameter of the digital signal s(n), in the example the value a(n) if the signal s(n) is an FM signal and the value $\hat{\Omega}_c$ is the signal s(n) is an AM signal, such second value being representative of the modulated digital signal s(n) affected by adjacent channel interference, and c) comparing the first value $a_f(n)$, $\Omega_c$ with the second value a(n), $\hat{\Omega}_c$ so to detect the adjacent channel interference in the modulated digital signal s(n).

In particular, the step b) comprises the steps:

b1) processing the digital signal s(n) for obtaining a derivative signal s'(n) representative of the derivative of the digital signal s(n), b2) applying a non-linear Teager-Kaiser function Ψ to the digital signal s(n) for generating a first signal Ψ[s(n)] representative of the energy content of the digital signal s(n), b3) applying the non-linear Teager-Kaiser function Ψ to the derivative signal s'(n) for generating a second signal Ψ[s'(n)] representative of the energy content of the derivative signal s'(n), and b4) processing the first signal Ψ[s(n)] and the second signal Ψ[s'(n)] for generating the second value a(n), $\hat{\Omega}_c$.

Advantageously, the step c) of comparing the first value $a_j(n)$, $\Omega_c$ and the second value a(n), $\hat{\Omega}_c$ comprises the step of generating a value able to detect the adjacent channel interference in the modulated digital signal s(n).

In accordance with one embodiment, the comparison step c) comprises the step of calculating the ratio $$\frac{a(n)}{a_j(n)}, \frac{\hat{\Omega}_c}{\Omega_c}$$

between the second value a(n), $\hat{\Omega}_c$ and the first value $a_j(n)$, $\Omega_c$. The adjacent channel interference in the modulated digital signal s(n) is detected when the value of the calculated ratio $$\frac{a(n)}{a_j(n)}, \frac{\hat{\Omega}_c}{\Omega_c}$$

is different from 1.

In particular, in the case of FM type signal s(n), the adjacent channel interference in the modulated digital signal s(n) is detected when the calculated value of the ratio $$\frac{a(n)}{a_j(n)}$$

is greater than 1, while in the case of the AM type signal s(n), the calculated value of the ratio $$\frac{\hat{\Omega}_c}{\Omega_c}$$

can either be greater or less than 1 in the presence of adjacent channel interference in the modulated digital signal s(n).

Adjacent Channel Interference in FM

Figure 3:
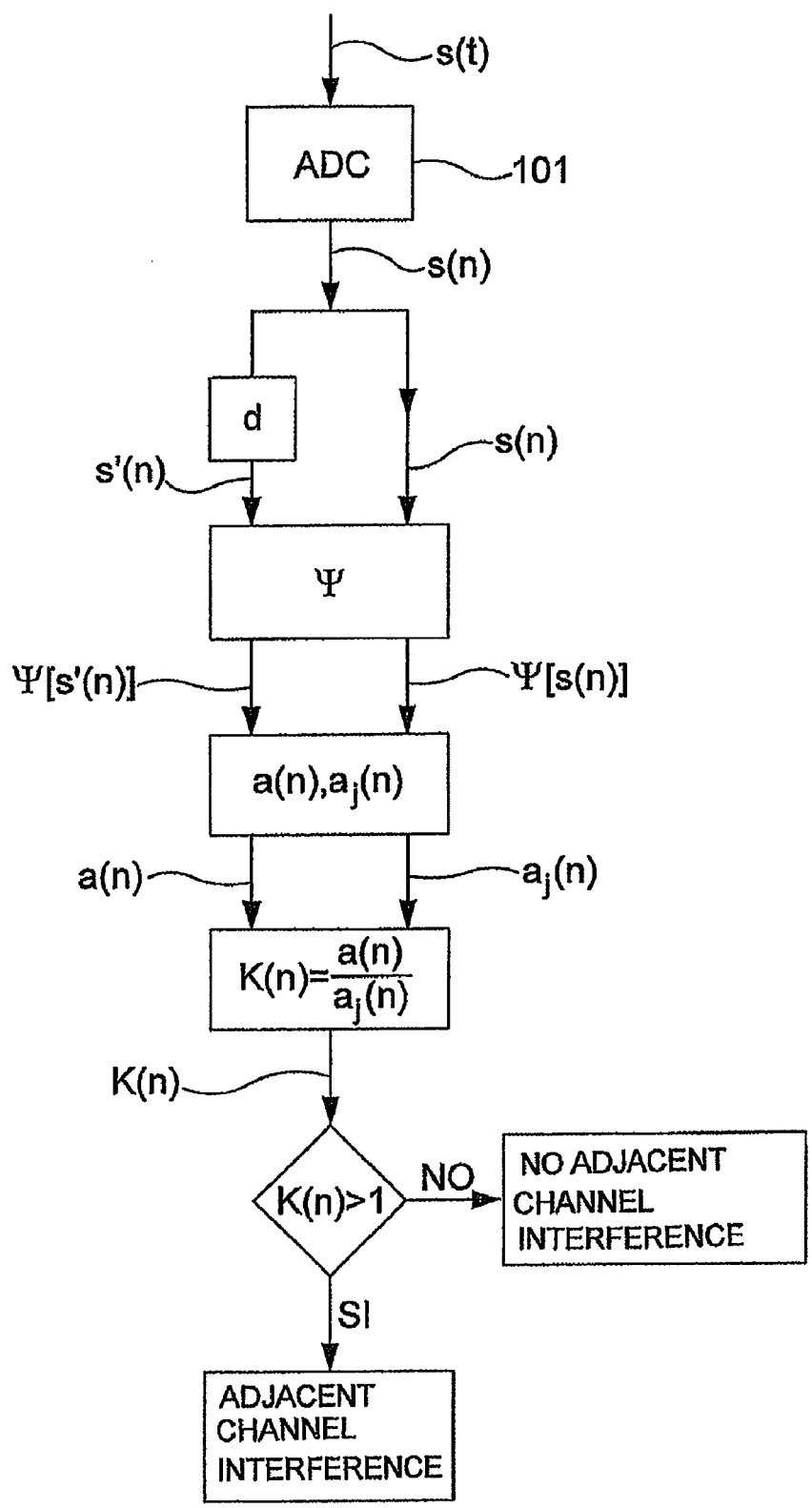
FIGS. 3, 4, and 5 show different explanatory schematic diagrams of the method for detecting and suppressing the adjacent channel interference in a modulated digital signal in accordance with one embodiment.

With reference to FIG. 3, the application of the method according to one embodiment is described below for detecting the adjacent channel interference in a modulated digital signal s(n) of FM type, received on a predetermined channel frequency value $\Omega_c/2\pi$, or rather channel angular frequency value $\Omega_c$. The FM modulated digital signal s(n) is composed of a modulating signal and a carrier signal and is represented by a series of samples.

In the case of FM signal, the aforesaid characteristic parameter is a carrier signal amplitude value.

The FM modulated digital signal s(n) has a predefined frequency deviation $f_m$.

According to one embodiment, the method comprises a step of setting a first value of filtering bandwidth $f_j$ less than the value of the predefined frequency deviation $f_m$, and a second filtering bandwidth value $f_f$ comprised between the first filtering bandwidth value $f_j$ and the value of the predefined frequency deviation $f_m$, for generating the first amplitude value $a_j(n)$ of the carrier signal representative of the digital signal s(n) free of adjacent channel interference and the second amplitude value a(n) of the carrier signal representative of the digital signal s(n) affected by adjacent channel interference.

As outlined above, the modulated digital signal s(n) is obtained by the analog-digital conversion of the modulated analog signal s(t).

The step a) of the method therefore comprises the steps of:

a1) filtering the analog signal s(t), with a filtering angular frequency centred on the predetermined channel angular frequency $\Omega_c$ and with a passband equal to the value of the first filtering band $f_j$, for generating, by analog-digital conversion, a first filtered digital signal $s_j(n)$, a2) carrying out the steps from b1) to b4), where the digital signal s(n) is substituted with the first filtered digital signal $s_j(n)$, for generating the first amplitude value $a_j(n)$ of the carrier signal of the first filtered digital signal $s_j(n)$, representative of the digital signal s(n) free of adjacent channel interference.

For simplicity, the references to the signals generated after the filtering step are omitted, since such filtered analog signals are subsequently converted into filtered digital signals which are used by the method described below.

In substance, step a2), where the analog signal s(n) is substituted with a first filtered digital signal $s_j(n)$, comprises the steps of:

processing the first filtered digital signal ($s_j(n)$) to obtain a derivative signal:

$$s'_j(n) = \frac{s_j(n+1) - s_j(n-1)}{2},$$

applying the non-linear Teager-Kaiser function Ψ to the first filtered digital signal $s_j(n)$ for generating a first signal $\Psi_j[s_j(n)]$ representative of the energy content of the first filtered digital signal $s_j(n)$, applying the non-linear Teager-Kaiser function Ψ to the derivative signal $s_j'(n)$ for generating a second signal $\Psi_j[s_j'(n)]$ representative of the energy content of the derivative signal $s_j'(n)$, and processing the first signal $\Psi_j[s_j(n)]$ and the second signal $\Psi_j[s_j'(n)]$ for generating the first amplitude value $a_j(n)$ according to the formula (4):

$$a_j(n) \cong \frac{2 \cdot \Psi_j[s_j(n)]}{\sqrt{\Psi_j[s_j(n+1) - s_j(n-1)]}}$$

It should be pointed out that the derivative signal $$s'_j(n) = \frac{s_j(n+1) - s_j(n-1)}{2}$$

is obtained by applying the symmetric difference algorithm. Alternatively, one can apply the backward difference algorithm for which $s_j'(n) = s_j(n+1) - s_j(n)$.

The step b) comprises the steps of:
- filtering the analog signal s(t), with a filtering angular frequency centered on a predetermined channel angular frequency value $\Omega_c$ and with a passband equal to the second filtering band $f_f$, for generating, by the analog-digital conversion step, a second filtered digital signal $s_f(n)$, and
- carrying out the steps from b1) to b4), where the digital signal s(n) is substituted with the second filtered digital signal $s_f(n)$, for generating the second amplitude value (a(n)) of the carrier signal of the second filtered digital signal $s_f(n)$, representative of the digital signal s(n) affected by adjacent channel interference.

In substance, the aforesaid step of carrying out the steps from b1) to b4), where the digital signal s(n) is substituted with a second filtered digital signal $s_f(n)$, comprises the steps of:
processing the second filtered digital signal ($s_f(n)$) to obtain a derivative signal:

$$s'_f(n) = \frac{s_f(n+1) - s_f(n-1)}{2},$$

applying the non-linear Teager-Kaiser function $\Psi$ to the second filtered digital signal $s_f(n)$ for generating a first signal $\Psi_f[s_f(n)]$ representative of the energy content of the second filtered digital signal $s_f(n)$, applying the non-linear Teager-Kaiser function $\Psi$ to the derivative signal $s'_f(n)$ for generating a second signal $\Psi_f[s'_f(n)]$ representative of the energy content of the derivative signal $s'_f(n)$, and processing the first signal $\Psi_f[s_f(n)]$ and the second signal $\Psi_f[s'_f(n)]$ for generating the second amplitude value $a_f(n)$ according to the formula (5):

$$a(n) \cong \frac{2 \cdot \Psi_f[s_f(n)]}{\sqrt{\Psi_f[s_f(n+1) - s_f(n-1)]}}$$

Finally, the step c) comprises the step of calculating the value $\kappa(n)$ of the ratio $$\frac{a(n)}{a_j(n)}$$

between the second amplitude value a(n) and the first amplitude value $a_j(n)$.

In particular, the comparison step c) comprises the step of comparing the calculated value $\kappa(n)$ of the ratio $$\frac{a(n)}{a_j(n)}$$

with a predetermined threshold value $\kappa_{th}(n)$.

Figure 5:
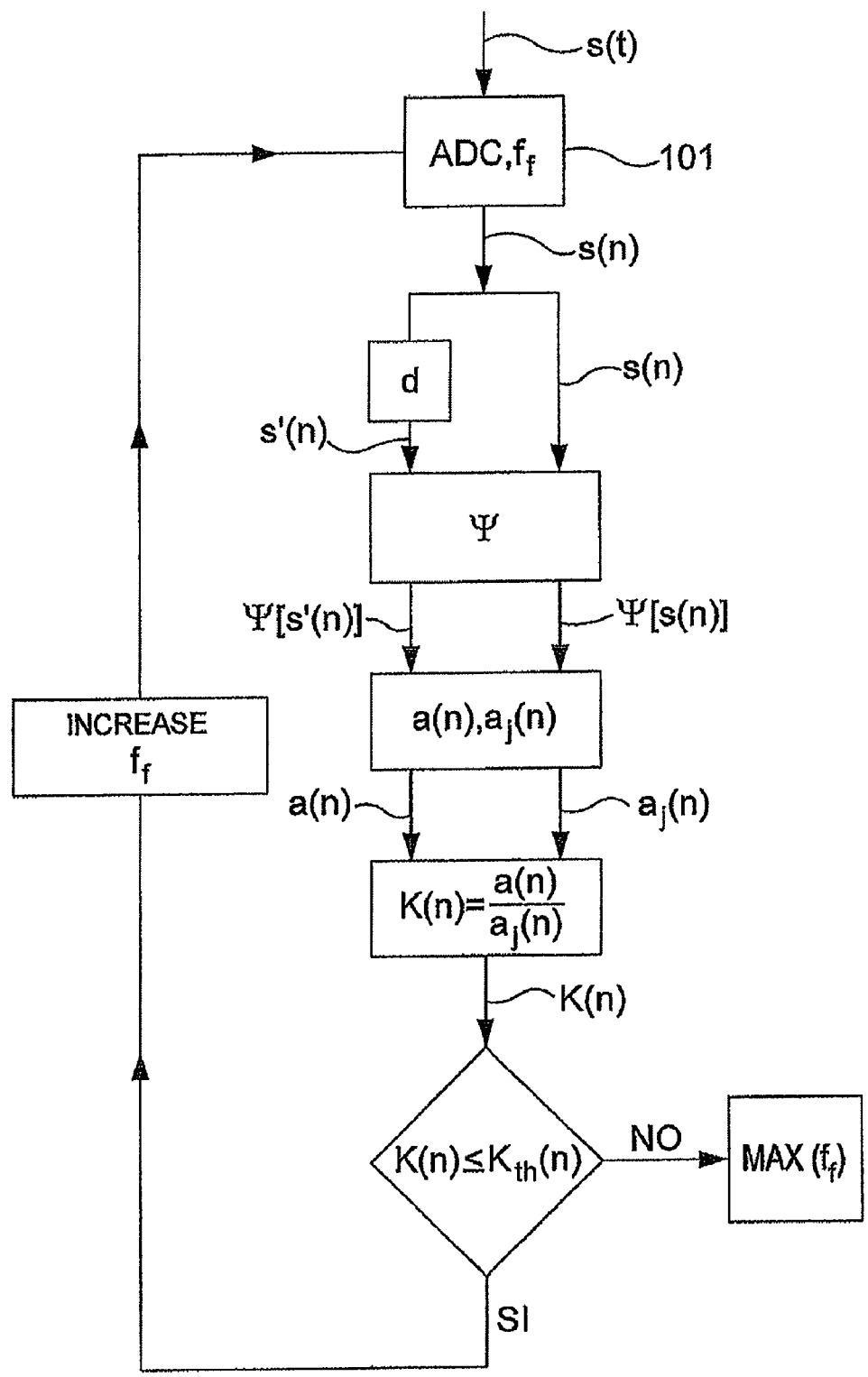

With reference to FIG. 5, in order to reduce or suppress the adjacent channel interference detected in the signal s(n), the method comprises the steps of:
d) increasing, by a predetermined amount, for example ±7.5 KHz, the second filtering bandwidth value $f_f$, and
e) recursively repeating steps b), c) and d) for the respective second increased filtering bandwidth value $f_f$ until the corresponding calculated ratio value $\kappa(n)$ is less than or equal to the threshold value $\kappa_{th}(n)$, where each second filtering bandwidth value $f_f$ represents a filtering bandwidth value able to reduce/suppress the adjacent channel interference in the modulated digital signal s(n).

The method also provides the step of
f) obtaining the greatest second filtering bandwidth value $f_f$ for which the calculated ratio value $\kappa(n)$ is less than or equal to the threshold value $\kappa_{th}(n)$, when the calculated ratio value $\kappa(n)$ becomes greater than the threshold value $\kappa_{th}(n)$. Such greatest second filtering bandwidth value $f_f$ representing the optimal filtering bandwidth value able to reduce/suppress the adjacent channel interference in the modulated digital signal s(n). The values of second filtering bandwidth value $f_f$ less than the greatest second filtering bandwidth value $f_f$ represent values that are still good for reducing/suppressing the adjacent channel interference in the modulated digital signal s(n).

To suppress or at least greatly reduce the adjacent channel interference in the FM modulated digital signal s(n) received on the predetermined channel angular frequency value $\Omega_c$, the method comprises the steps of:
detecting the adjacent channel interference in the digital signal s(n) to obtain the greatest second filtering bandwidth value $f_f$ for which the calculated ratio value $\kappa(n)$ is less than the threshold value $\kappa_{th}(n)$, and
filtering the analog signal s(t) with a filtering angular frequency centred on the predetermined channel angular frequency value $\Omega_c$ and with a passband equal to the value of the greatest obtained second filtering bandwidth value $f_f$, for generating, by the analog-digital conversion, a filtered digital signal substantially free of adjacent channel interference or with reduced adjacent channel interference.

Below, a specific application example is described of the method in which the signal s(n), affected by adjacent channel interference, is composed of a signal $x_C(n)$ present in the desired channel $\Omega_c$ and representative of the signal s(n) free of adjacent channel interference, a signal $x_L(n)$ present to the left, in the frequency axis, of the desired channel, and a signal $x_R(n)$ present to the right of the desired channel, where $x_L(n)$ and $x_R(n)$ represent the signals of the channels $\Omega_{cL}$ and $\Omega_{cR}$ adjacent to the signal $x_C(n)$ of the desired channel $\Omega_c$, in which:

$$x_C(n) = a_C(n) \cdot \cos(\Omega_c \cdot n + \Omega_m \cdot \int_0^n q_C(v) \cdot dv + \phi_C) \quad (6)$$

$$x_L(n) = a_L(n) \cdot \cos(\Omega_{cL} \cdot n + \Omega_{mL} \cdot \int_0^n q_L(v) \cdot dv + \phi_L) \quad (7)$$

$$x_R(n) = a_R(n) \cdot \cos(\Omega_{cR} \cdot n + \Omega_{mR} \cdot \int_0^n q_R(v) \cdot dv + \phi_R) \quad (8)$$

in which:
the terms a(n) in (6), (7) and (8) represent the component of FM carrier signal, $\vartheta(n) = \Omega_c + \Omega_m \cdot q(n)$ represents the instantaneous angular frequency,
and
q(n) the component of FM modulating signal where:

$$|q(n)| \leq 1 \, \forall n \in \{I \geq 0\} \, 0 \leq \Omega_c \pm \Omega_m \leq \pi,$$

$\Omega_c$ is the angular frequency of oscillation of the channel carrier signal,
$\Omega_m$ is the angular deviation frequency of the modulating signal,
with the correct substitutions of subscripts for the signals $x_C(n)$, $x_L(n)$ and $x_R(n)$, not shown for the sake of brevity.

The received signal s(n) is therefore the sum of $x_C(n)$, $x_L(n)$ and $x_R(n)$. Applying the non-linear Teager Kaiser function to the received signal s(n), one obtains:

$$\Psi_F[s(n)] = \Psi_F[x_C(n) + x_L(n) + x_R(n)] = \Psi_F[x_C(n)] + \Psi_F[x_L(n) + x_R(n)] + 2 \cdot \Psi_F[x_C(n), x_L(n) + x_R(n)] \approx \Psi_F[x_C(n)] + \Psi_F[x_L(n) + x_R(n)] \quad (9),$$

where $\Psi_F[x_C(n), x_L(n)+x_R(n)]$ was placed equal to zero since $x_C(n)$ is correlated neither with $x_L(n)$ nor with $x_R(n)$ or with any other combination of $x_L(n)$ and $x_R(n)$, including the derivatives. From this, it derives that:

$$\Psi_F[s(n)] = \Psi_F[x_C(x) + x_L(n) + x_R(n)] \quad (10)$$

$$\approx \Psi_F[x_C(x)] + \Psi_{:F}[x_L(n)] + \Psi_F[x_R(n)]$$

$$\cong a_C^2(n) \cdot \sin^2[\Omega_c + \Omega_m \cdot q(n)] +$$

$$a_L^2(n) \cdot \sin^2[\Omega_{cL} + \Omega_{mL} \cdot q_L(n)] +$$

$$a_R^2(n) \cdot \sin^2[\Omega_{cR} + \Omega_{mR} \cdot q_R(n)],$$

and that:

$$\Psi_F[s'(n)] = \Psi_F\left[\frac{\partial}{\partial n}\langle x_C(n) + x_L(n) + x_R(n)\rangle\right] \quad (11)$$

$$\approx \Psi_F\left[\frac{\partial}{\partial n}x_C(n)\right] + \Psi_F\left[\frac{\partial}{\partial n}x_L(n)\right] + \Psi_F\left[\frac{\partial}{\partial n}x_R(n)\right]$$

$$\cong a_C^2(n) \cdot \sin^4[\Omega_c + \Omega_m \cdot q(n)] +$$

$$a_L^2(n) \cdot \sin^4[\Omega_{cL} + \Omega_{mL} \cdot q_L(n)] +$$

$$a_R^2(n) \cdot \sin^4[\Omega_{cR} + \Omega_{mR} \cdot q_R(n)],$$

where s'(n) is the derivative signal representative of the derivative of the digital signal s(n) and $\Psi_F$ represents the filtered version of the function $\Psi$ applied to a signal in the band of the FM signals. In other words, $\Psi_F$ represents the signal resulting from the transformation by means of the Teager-Kaiser $\Psi$ function and subsequently filtered.

In the case of signal $x(n)=a(n)\cdot\cos(\Omega_c\cdot n+\Omega_m\int_0^n q(v)\cdot dv+\phi)$, by applying the symmetric difference algorithm for which:

$$\Psi[x'(n)] = \Psi\left[\frac{x(n+1) - x(n-1)}{2}\right] \quad (12)$$

one obtains:

$$\Psi[x(n+1)-x(n-1)] \approx 4\cdot a^2(n) \cdot \sin^4[\Omega_c+\Omega_m\cdot q(n)] \quad (13),$$

from which one has:

$$q(n)\cdot\Omega_m \cong \frac{1}{2}\cdot\arccos\left(1 - \frac{\Psi_F[x(n+1)-x(n-1)]}{2\cdot\Psi_F[x(n)]}\right) - \Omega_c. \quad (14)$$

It can therefore be demonstrated that the modulating signal is given by the relation:

$$\Omega_{mj}\cdot q_j(n) \cong \quad (15)$$

$$\frac{1}{2}\cdot\arccos[1 - \eta(n) + n(\eta)\cdot\cos(2\cdot\Omega_{cj} + 2\cdot\Omega_{mj}\cdot q_j(n))] - \Omega_{cj}$$

where:

$$\eta(n) = \frac{1 + \sum_{k=1}^{2} \frac{a_k^2(n)}{a_j^2(n)} \cdot \frac{\sin^2(\Omega_{ck}+\Omega_{mk}\cdot q_k(n))}{\sin^2(\Omega_{cj}+\Omega_{mj}\cdot q_j(n))}}{1 + \sum_{k=1}^{2} \frac{a_k^2(n)}{a_j^2(n)} \cdot \frac{\sin^2(\Omega_{ck}+\Omega_{mk}\cdot q_k(n))}{\sin^2(\Omega_{cj}+\Omega_{mj}\cdot q_j(n))}} \approx 1 \quad (16)$$

in which the j index indicates one of the three signals $x_C(n)$, $x_L(n)$ and $x_R(n)$, or rather the signal of the desired channel $x_C(n)$ and the two signals of the adjacent channels $x_L(n)$ and $x_R(n)$, and the summation $\Sigma$ is executed on the remaining two signals.

From this it is inferred that a correct demodulation of the signal s(n), sum of the signals $x_C(n)$, $x_L(n)$ and $x_R(n)$ having respective channel angular frequency values $\Omega_c$, $\Omega_{cL}$ and $\Omega_{cR}$ very close to each other, cannot be obtained without a good selectivity of the desired FM channel.

In particular, the desired channel identified with the j index can be correctly demodulated if and only if the ratio values $$\frac{a_k^2(n)}{a_j^2(n)}$$

are sufficiently small.

Applying the expression (12) to the received signal s(n) affected by adjacent channel interference and hence the sum of the signals $x_C(n)$, $x_L(n)$ and $x_R(n)$, one obtains that:

$$a(n) \cong \frac{2\cdot\Psi_F[s(n)]}{\sqrt{\Psi_F[s(n+1)-s(n-1)]}} \quad (17)$$

$$= a_j(n) \cdot \frac{1 + \sum_{k=1}^{2} \frac{a_k^2(n)}{a_j^2(n)} \cdot \frac{\sin^2(\Omega_{ck}+\Omega_{mk}\cdot q_k(n))}{\sin^2(\Omega_{cj}+\Omega_{mj}\cdot q_j(n))}}{\sqrt{1 + \sum_{k=1}^{2} \frac{a_k^2(n)}{a_j^2(n)} \cdot \frac{\sin^4(\Omega_{ck}+\Omega_{mk}\cdot q_k(n))}{\sin^4(\Omega_{cj}+\Omega_{mj}\cdot q_j(n))}}} \quad (18)$$

$$\approx a_j(n) \cdot \sqrt{1 + \sum_{k=1}^{2} \frac{a_k^2(n)}{a_j^2(n)}}, \quad (19)$$

where a(n) is the amplitude of the carrier signal of the received signal s(n) affected by adjacent channel interference.

After having set a central filtering angular frequency equal to the channel angular frequency which one wishes to receive, in the example equal to the predetermined channel angular frequency value $\Omega_c$ of the signal $x_C(n)$, the value of a(n) was obtained by initially filtering the analog signal s(t) with a narrow angular passband centered on such channel angular frequency $\Omega_c$, such that the value a(n) substantially corresponds to the value $a_j(n)$ of the amplitude of the carrier signal of the digital signal s(n) free of adjacent channel interference, that is substantially the single signal $x_C(n)$.

Subsequently, the value of a(n) is evaluated by increasing the value of the filtering passband of the analog signal s(t), for example with passes of ±7.5 KHz, up to a predefined maximum value, for example ±160 KHz to determine a sequence of values:

$$k(n) = \frac{a(n)}{a_j(n)} \cong \sqrt{1 + \sum_{k=1}^{2} \frac{a_k^2(n)}{a_j^2(n)}}, \quad (20)$$

where the value a(n) corresponds to the value a(n) for a digital signal s(n) affected by adjacent channel interference, that is with a channel contribution of at least one of the signals $x_L(n)$ and $x_R(n)$.

The choice of the optimal filtering band for reducing/suppressing the adjacent channel interference can be set, for example, for values of $\kappa(n) \leq \kappa_{th}(n)$, where $\kappa_{th}(n)$ is a limit threshold equal, for example, to 1.005 if the reduction of the adjacent channel must be achieved for adjacent stations $x_L(n)$, $x_R(n)$ which have angular frequency components greater than 20 dB with respect to the desired signal $x_C(n)$ of the desired angular band $\Omega_c$.

It should be pointed out that the threshold value $\kappa_{th}(n)$ can be set in relation with the intensity of the desired field.

Adjacent Channel Interference in AM

Figure 4:
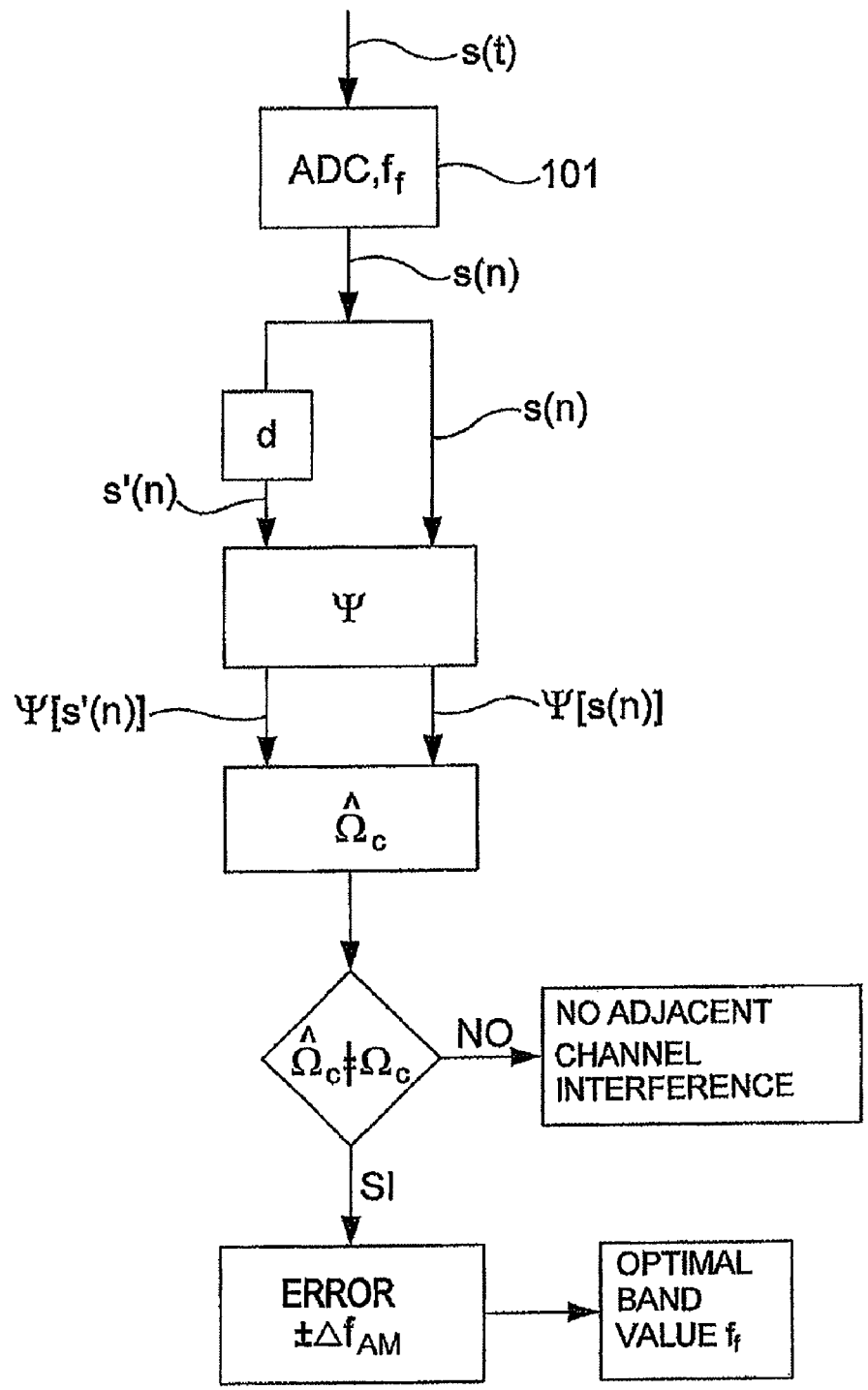

With reference to FIG. 4, the application is described of a method for detecting and suppressing the adjacent channel interference in a modulated digital signal s(n) of AM type received on a predetermined channel carrier angular frequency value, for simplicity named $\Omega_c$ but evidently different from the channel angular frequency value $\Omega_c$ mentioned with reference to the treatment for the FM signal.

The AM modulated digital signal s(n) is composed of a modulating signal and a carrier signal oscillating at a channel carrier angular frequency $\hat{\Omega}_c$ and is represented by a series of channels.

In the AM signal case, the aforesaid characteristic parameter being a value of channel carrier angular frequency.

In particular, step a) comprises the step of receiving, for example as value set by a user in an AM receiver, such predetermined channel carrier angular frequency value $\Omega_c$, representative of the digital signal s(n) free of adjacent channel interference, step b) generates the value of the channel carrier angular frequency $\hat{\Omega}_c$ representative of the digital signal s(n) affected by adjacent channel interference, and step c) comprises the step of calculating the ratio $$\frac{\hat{\Omega}_c}{\Omega_c}$$

between the generated channel carrier angular frequency value $\hat{\Omega}_c$ and the received channel carrier angular frequency value $\Omega_c$.

In particular, the step of generating the channel carrier angular frequency value $\hat{\Omega}_c$ comprises the steps of:

b1) processing the digital signal s(n) to obtain a derivative signal s'(n) representative of the derivative of the digital signal s(n), b2) applying the non-linear Teager-Kaiser $\Psi$ function to the digital signal s(n) for generating a first signal $\Psi[s(n)]$ representative of the energy content of the digital signal s(n), b3) applying the non-linear Teager-Kaiser $\Psi$ function to the derivative signal s'(n) for generating a second signal $\Psi[s'(n)]$ representative of the energy content of the derivative signal s'(n), and b4) processing the first signal $\Psi[s(n)]$ and the second signal $\Psi[s'(n)]$ for generating the channel carrier angular frequency value $\hat{\Omega}_c$ by applying the following formula:

$$\hat{\Omega}_c \cong \frac{1}{2} \cdot \arccos\left(1 - \frac{\Psi_F[s(n+1) - s(n-1)]}{2 \cdot \Psi_F[s(n)]}\right).$$

The method moreover comprises the step of obtaining an optimal filtering bandwidth value able to reduce/suppress the adjacent channel interference in the modulated digital signal s(n), as a function of the result of the comparison step c) or rather as a function of the calculated value of the ratio $$\frac{\hat{\Omega}_c}{\Omega_c}$$

between the generated channel carrier angular frequency value $\hat{\Omega}_c$ and the received channel carrier angular frequency value $\Omega_c$.

A specific example is described below in which the signal s(n), affected by adjacent channel interference, is composed of a signal $x_C(n)$ present in the desired channel $\Omega_c$, of a signal $x_L(n)$ present to the left, in the frequency axis, of the desired channel and a signal $x_R(n)$ present to the right of the desired channel, where $x_L(n)$ and $x_R(n)$ represent the signals of channels adjacent to the signal x(n) on the desired channel, in which:

$$x_C(n) = A_C \cdot (1 + m_C \cdot \sin(\Omega_a \cdot n)) \cdot \cos(\Omega_c \cdot n) \quad (21)$$

$$x_L(n) = A_L \cdot (1 + m_L \cdot \sin(\Omega_{aL} \cdot n)) \cdot \cos(\Omega_{cL} \cdot n) \quad (22)$$

$$x_R(n) = A_R \cdot (1 + m_R \cdot \sin(\Omega_{aR} \cdot n)) \cdot \cos(\Omega_{cR} \cdot n) \quad (23)$$

where $A \cdot (1 + m \cdot \sin(\Omega_a \cdot n)) = a(n)$ represents the component of AM modulating signal of the respective signal $x_C(n)$, $x_L(n)$, $x_R(n)$ and $\Omega_c$ the carrier signal angular frequency with the correct subscript substitutions.

The received signal s(n) is the sum of $x_C(n)$, $x_L(n)$ and $x_R(n)$. Applying the non-linear Teager Kaiser function to the received signal (n), one obtains:

$$\Psi_F[s(n)] = \Psi_F[x_C(n) + x_L(n) + x_R(n)] = \Psi_F[x_C(n)] + \Psi[x_L(n) + x_R(n)] + 2 \cdot \Psi[x_C(n), x_L(n) + x_R(n)] \approx \Psi[x_C(n)] + \Psi[x_L(n) + x_R(n)] \quad (24),$$

where $\Psi[x_C(n), x_L(n) + x_R(n)]$ was set equal to zero since $x_C(n)$ is correlated neither with $x_L(n)$ nor with $x_R(n)$, nor with any combination of $x_L(n)$ and $x_R(n)$, including the derivatives. From this one derives that:

$$\Psi_F[x_C(n) + x_L(n) + x_R(n)] \approx \quad (25)$$
$$\Psi_F[x_C(n)] + \Psi_F[x_L(n)] + \Psi_F[x_R(n)] \cong A^2 \cdot (1 + m \cdot \sin(\Omega_a \cdot n))^2 \cdot \sin^2\Omega_c +$$
$$A_L^2 \cdot (1 + m_L \cdot \sin(\Omega_{aL} \cdot n))^2 \cdot \sin^2\Omega_{cL} + A_R^2 \cdot (1 + m_R \cdot \sin(\Omega_{aR} \cdot n))^2 \cdot \sin^2\Omega_{cR},$$

and that $$\Psi_F[s'(n)] = \Psi_F\left[\frac{\partial}{\partial n}\langle x_C(n) + x_L(n) + x_R(n)\rangle\right] \approx \quad (26)$$
$$\Psi_F\left[\frac{\partial}{\partial n}x_C(n)\right] + \Psi_F\left[\frac{\partial}{\partial n}x_L(n)\right] + \Psi_F\left[\frac{\partial}{\partial n}x_R(n)\right] \cong$$
$$4A^2 \cdot (1 + m \cdot \sin(\Omega_a \cdot n))^2 \cdot \sin^4\Omega_c + 4A_L^2 \cdot (1 + m_L \cdot \sin(\Omega_{aL} \cdot n))^2 \cdot \sin^4\Omega_{cL} +$$
$$4A_R^2 \cdot (1 + m_R \cdot \sin(\Omega_{aR} \cdot n))^2 \cdot \sin^4\Omega_{cR},$$

where s'(n) is a derivative signal representative of the derivative of the digital signal s(n) and $\Psi_F$ represents the function $\Psi$ applied to a filtered signal in the AM signal band.

In the case of a signal $x(n)=A\cdot(1+m\cdot\sin(\Omega_a\cdot n))\cdot\cos(\Omega_c\cdot n)$, by applying the symmetric difference algorithm, such that $$\Psi[x'(n)] = \frac{\Psi[x(n+1) - x(n-1)]}{2}$$

is obtained:

$$\Psi[x(n+1)-x(n-1)]\approx 4\cdot a^2(n)\cdot\sin^4[\Omega_c+\Omega_m\cdot q(n)] \quad (27),$$

from which one has (28):

$$a(n) \cong \frac{2\cdot\Psi[x(n)]}{\sqrt{\Psi[x(n+1)-x(n-1)]}}$$

It can therefore be demonstrated with that the modulating signal $\hat{a}(n)=\hat{A}\cdot(1+\hat{m}\cdot\sin(\hat{\Omega}_a\cdot n))$, in which the parameters with "^" represent the versions per signal s(n) affected by adjacent channel interference of the original parameters per signal x(n) free of adjacent channel interference, is given by the relation:

$$\hat{a}(n) = \quad (29)$$

$$\frac{2\cdot\Psi_F[s(n)]}{\sqrt{\Psi_F[s(n+1) - s(n-1)]}} \approx [A\cdot(1+m\cdot\sin(\Omega_a\cdot n))]\cdot\rho(n)$$

where:

$$s'(n) = \frac{s(n+1) - s(n-1)}{2}$$

and $$\rho(n) = \sqrt{1 + \sum_{k=1}^{2}\frac{A_k^2\cdot(1+m_k\cdot\sin(\Omega_k\cdot n))^2}{A^2\cdot(1+m\cdot\sin(\Omega_a\cdot n))^2}} \quad (30)$$

which is minimized to be as close as possible to the value 1, reducing the band when the adjacent channel interference is detected in the signal s(n).

In the present case, the adjacent channel interference can be detected by measuring the oscillation frequency $$\hat{f}_c \square \frac{\hat{\Omega}_c \cdot f_s}{2\cdot\pi}$$

of the carrier signal which, in the absence of adjacent channel interference, must be equal to that set by the user in reception or rather equal to the predetermined channel angular frequency value $\Omega_c$, with:

$$\hat{f}_c = \frac{\hat{\Omega}_c}{2\cdot\pi}$$

from which:

$$\hat{f}_c = \frac{\hat{\Omega}_c}{2\cdot\pi} = \frac{1}{4\cdot\pi}\cdot\arccos\left\{1 - \frac{\Psi_F[s(n+1) - s(n-1)]}{2\cdot\Psi_F[s(n)]}\right\}. \quad (32)$$

From the expression (32) one has that:

$$\hat{\Omega}_c \cong \frac{1}{2}\cdot\arccos\left(1 - \frac{\Psi_F[s(n+1) - s(n-1)]}{2\cdot\Psi_F[s(n)]}\right) \approx \quad (33)$$

$$\approx \frac{1}{2}\cdot\arccos(1 - 2\cdot\sin^2\Omega_c\cdot v^2(n)) \quad (34)$$

where:

$$v(n) = \frac{1 + \sum_{k=1}^{2}\frac{A_k^2\cdot(1+m_k\cdot\sin(\Omega_k\cdot n))^2}{A^2\cdot(1+m\cdot\sin(\Omega_a\cdot n))^2}\cdot\frac{\sin^4\Omega_k}{\sin^4\Omega_c}}{1 + \sum_{k=1}^{2}\frac{A_k^2\cdot(1+m_k\cdot\sin(\Omega_k\cdot n))^2}{A^2\cdot(1+m\cdot\sin(\Omega_a\cdot n))^2}\cdot\frac{\sin^2\Omega_k}{\sin^2\Omega_c}}$$

If v(n)=1 then $\Omega_c=\hat{\Omega}_c$ or rather $f_c=\hat{f}_c$ and there is no adjacent channel interference; if instead v(n)≠1 then $\Omega_c\neq\hat{\Omega}_c$ or rather the ratio $$\frac{\hat{\Omega}_c}{\Omega_c}$$

is different from 1, or rather $f_c\neq\hat{f}_c$, and there is adjacent channel interference in the order of ±one pass of the tuning frequency, or ±9 KHz in the European AM transmission system and ±10 KHz in the American AM transmission system.

The choice of the filtering band of the signal s(t) is therefore carried out by set an appropriate threshold, which varies from producer to producer and which is a function of both the laws of the specific commercial area and the regulations of the producer company.

Figure 6:
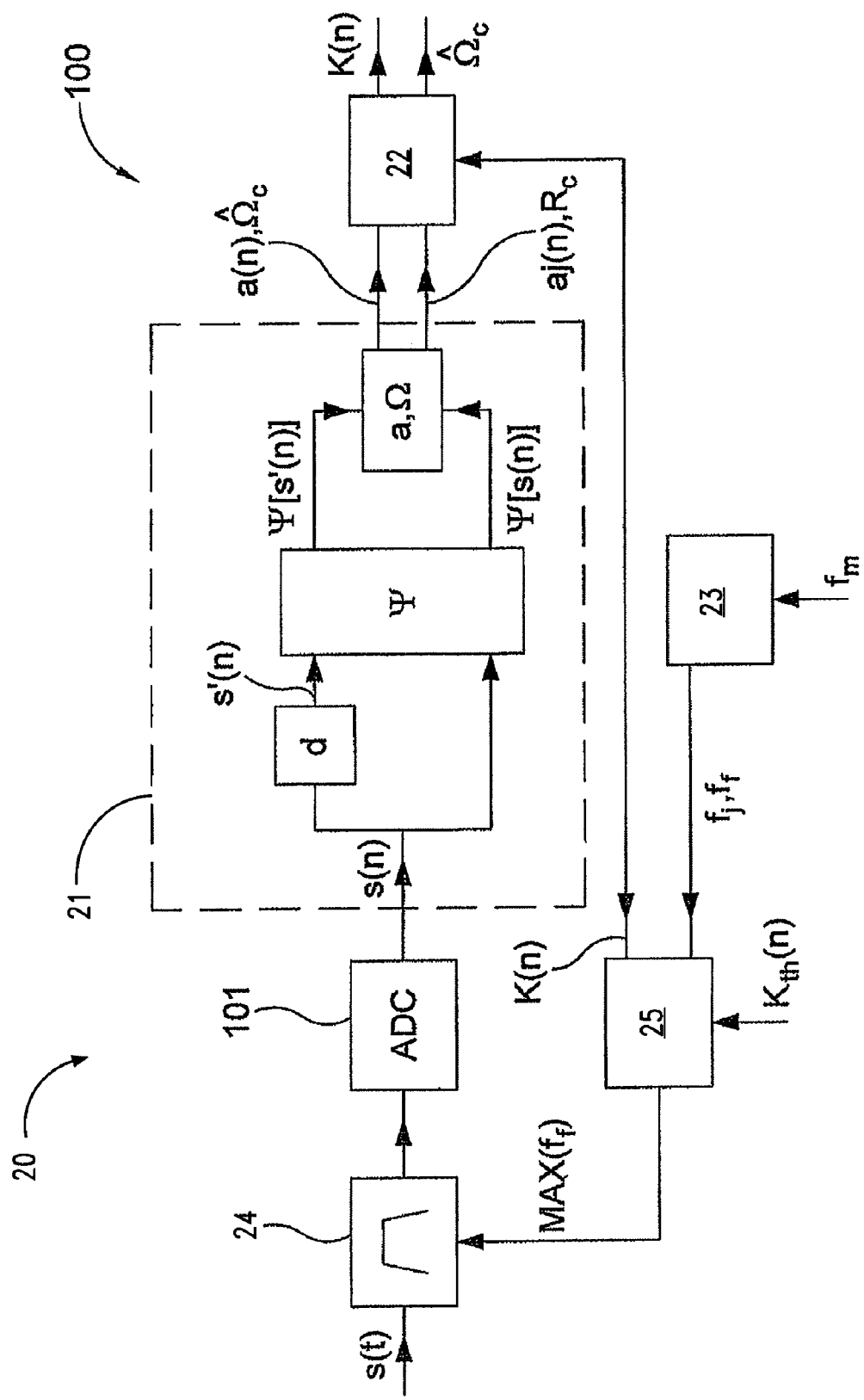
FIG. 6 shows a schematic block diagram of a receiver provided with an apparatus for detecting and reducing/suppressing the adjacent channel interference in a modulated digital signal in accordance with one embodiment.
Figure 7:
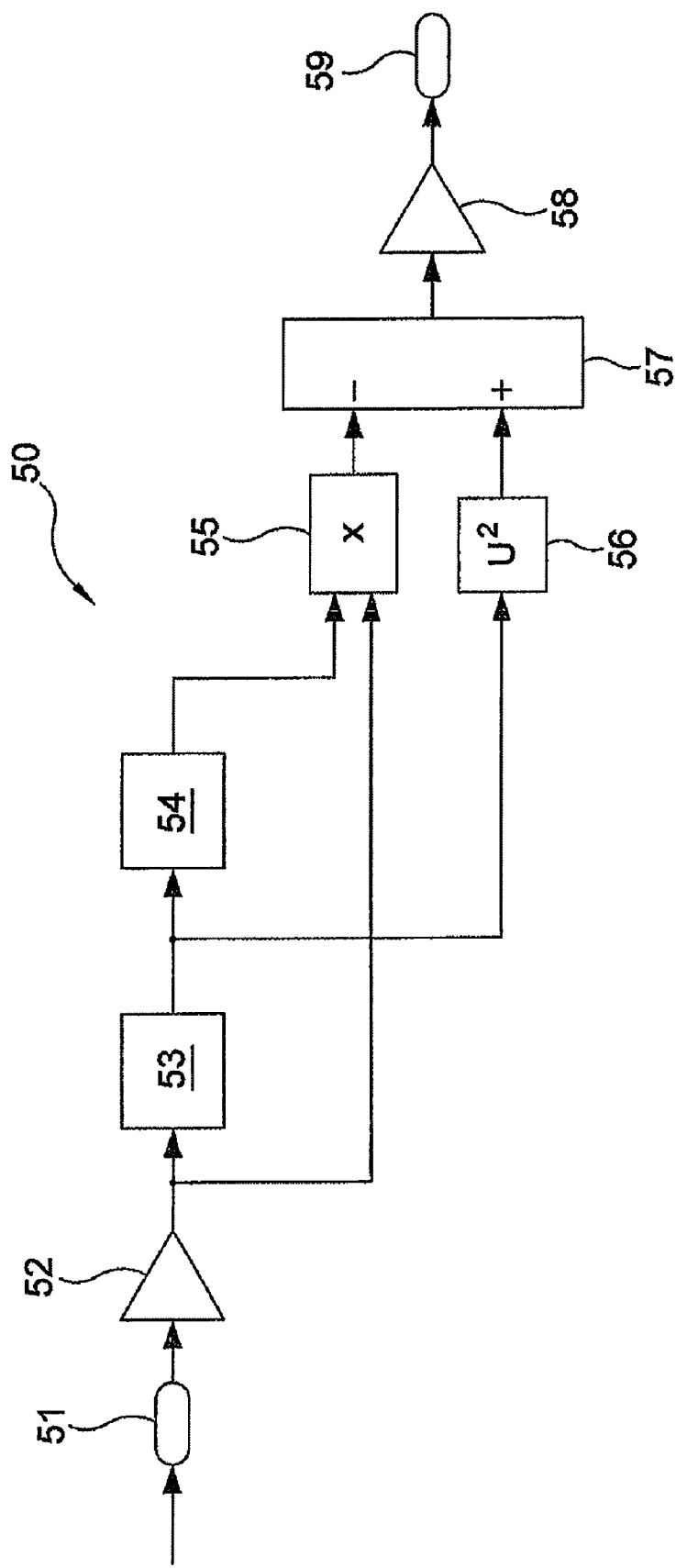
FIG. 7 shows a block diagram of a possible embodiment of a circuit of the apparatus made in the receiver illustrated in FIG. 6.

One embodiment an apparatus 20 for detecting the adjacent channel interference in the modulated digital signal s(n) (FIG. 6).

The apparatus 20 comprises processing means 21 able to receive the digital signal s(n) in input,
provide at least one first value $a_i(n)$, $\Omega_c$ of a characteristic parameter of the digital signal s(n), representative of the modulated digital signal free of adjacent channel interference, and
provide at least one second value a(n), $\hat{\Omega}_c$ of the characteristic parameter of the digital signal s(n), representative of the modulated digital signal affected by adjacent channel interference.

In particular, to provide the second value a(n), $\hat{\Omega}_c$ of the characteristic parameter of the digital signal s(n), the processing means 21 are able to:
process the digital signal s(n) to obtain a derivative signal s'(n) representative of the derivative of the digital signal s(n),
apply the non-linear Teager-Kaiser function $\Psi$ to the digital signal s(n) for generating a first signal $\Psi[s(n)]$ representative of the energy content of the digital signal s(n),
apply the non-linear Teager-Kaiser function $\Psi$ to the derivative signal s'(n) for generating a second signal $\Psi[s'(n)]$ representative of the energy content of the derivative signal s'(n), and
process the first signal $\Psi[s(n)]$ and the second signal $\Psi[s'(n)]$ for generating the second value a(n), $\hat{\Omega}_c$ of the characteristic parameter of the digital signal s(n), representative of the modulated digital signal affected by adjacent channel interference.

The processing means 21 can be implemented through hardware circuitry or a sequence of logic instructions or software.

In accordance with one embodiment, the processing means 21 comprise a circuit 50 (FIG. 5), able to apply the non-linear Teager Kaiser function or operator to the signal s(n) for generating the signal $\Psi[s(n)]=[s(n)]^2-s(n+1)\cdot s(n-1)$ representative of the energy content of the signal s(n). It should be pointed out that the same circuit 50 can be used for applying the Teager Kaiser function to any one signal entering the circuit 50.

The circuit 50 comprises an input 51 able to receive the signal s(n), preferably but not necessarily a pre-amplification stage 52 for amplifying the signal s(n), a first delay block 53 and a second delay block 54.

The first delay block 53 is connected to the input 51 and is able to delay a the input signal s(n) by one sample, while the second delay block 54 is input connected to the output of the first delay block 53 and is able to delay the signal output from the first delay block 53 by one sample.

The circuit 50 moreover comprises a multiplier 55 connected to the input 51 and to the output of the second delay block 54 to multiply the signal s(n) at the input 51 and the signal at the output of the second delay block 54, and a block 56 to execute the square of the signal output from the first delay block 53.

An adder block 57 is provided in the circuit 50 and has a first positive input connected with the output of the block 56 and a negative input connected to the output of the multiplier block 55.

Preferably, the circuit 50 comprises a post-amplification stage 58 for amplifying the signal output from the adder block 57.

Finally, the circuit 50 has an output 59 from which the output signal is drawn.

In the case in which, at the input 51 of the circuit 50, the sample s(n−1) of the signal s(n) is present, the signal at the output 59 is represented by the expression (3):

$$[s(n)]^2 - s(n+1) \cdot s(n-1)$$

or rather the Teager Kaiser $\Psi[s(n)]$ function of the signal x(n).

The apparatus 20 moreover comprises comparator means 22 coupled to the processing means 21 and able to compare the first value $a_j(n), \Omega_c$ with the second value $a(n), \hat{\Omega}_c$ to detect the adjacent channel interference in the modulated digital signal s(n).

Advantageously, the comparator means 22 are able for generating a value able to detect the adjacent channel interference in the modulated digital signal s(n).

In particular, the comparator means 22 are able to calculate the ratio $$\frac{a(n)}{a_j(n)}, \frac{\hat{\Omega}_c}{\Omega_c}$$

between the second value $a(n), \hat{\Omega}_c$ and the first value $a_j(n), \Omega_c$), the adjacent channel interference in the modulated digital signal s(n) being detected when the value of the calculated ratio $$\frac{a(n)}{a_j(n)}, \frac{\hat{\Omega}_c}{\Omega_c}$$

is different from 1.

More in particular, the adjacent channel interference in the modulated digital signal (s(n)) is detected when the value of the calculated ratio $$\frac{a(n)}{a_j(n)}$$

is greater than 1 and when the value of the calculated ration $$\frac{\hat{\Omega}_c}{\Omega_c}$$

is greater or less than 1.

In the case in which the modulated digital signal s(n) is a FM signal received on a predetermined value of channel angular frequency $\Omega_c$, in which the FM digital signal is composed of a modulating signal and of a carrier signal and is represented by a series of samples, the processing means 21 of the apparatus 20 are able for generating a carrier signal amplitude value.

The FM modulated digital signal s(n) has a predefined frequency deviation $f_m$. The apparatus 20 comprises a bandwidth value generator 23 able to receive in input the value of the predefined frequency deviation $f_m$ for generating the first filtering bandwidth value $f_j$, less than the value of the predefined frequency deviation $f_m$, and the second filtering bandwidth value $f_f$, comprised between the first filtering bandwidth value $f_j$ and the value of the predefined frequency deviation $f_m$.

Advantageously, the apparatus 20 comprises the analog-digital converter 101 able to receive the modulated analog signal s(t) so to convert such modulated analog signal s(t) into the modulated digital signal s(n) and a band-pass filter 24 coupled to the ADC 101, said band-pass filter 24 being centered on the predetermined channel angular frequency value $\Omega_c$ and having a passband.

The apparatus 20 moreover comprises a controller 25 coupled to the generator 23 for setting the first filtering bandwidth value $f_j$ and the second filtering bandwidth value $f_f$ to the value of the passband of the filter 24.

The filter 24 is able to filter the analog signal s(t) and is coupled to the ADC 101 for generating a first filtered digital signal $s_j(n)$, when the controller 25 sets the value of the passband equal to the first filtering bandwidth value $f_j$ and for generating a second filtered digital signal $s_f(n)$, when the controller 25 sets the value of the passband equal to the second filtering bandwidth value $f_f$.

The processing means 21 are therefore able to process the first filtered digital signal $s_j(n)$ so for generating the first amplitude value $a_j(n)$ of the carrier signal of the first filtered digital signal $s_j(n)$, representative of the digital signal s(n) free of adjacent channel interference, and to process the second filtered digital signal $s_f(n)$ so for generating the second amplitude value $a_f(n)$ of the carrier signal of the second filtered digital signal $s_f(n)$, representative of the digital signal s(n) affected by adjacent channel interference.

The comparator means 22 are able to calculate the value $\kappa(n)$ of the ratio $$\frac{a(n)}{a_j(n)}$$

between the second amplitude value $a(n)$ and the first amplitude value $a_j(n)$.

In accordance with one embodiment of the apparatus 20, still in the case of signal s(n) of FM type, the processing means 21 are able to:

process the first filtered digital signal $(s_j(n))$ to obtain the derivative signal $$s'_j(n) = \frac{s_j(n+1) - s_j(n-1)}{2},$$

apply the non-linear Teager-Kaiser function $\Psi$ to the first filtered digital signal $s_j(n)$ for generating the first signal $\Psi_j[s_j(n)]$ representative of the energy content of the first filtered digital signal $s_j(n)$, apply the non-linear Teager-Kaiser function Ψ to the derivative signal $s_j'(n)$ for generating the second signal $\Psi_j[s_j'(n)]$ representative of the energy content of the derivative signal $s_j'(n)$, and process the first signal $\Psi_j[s_j(n)]$ and the second signal $\Psi_j[s_j'(n)]$ for generating the first amplitude value $a_j(n)$ according to the formula (4) reported below:

$$a_j(n) \cong \frac{2 \cdot \Psi_j[s_j(n)]}{\sqrt{\Psi_j[s_j(n+1) - s_j(n-1)]}}$$

The processing means 21 are moreover able to:
process the second filtered digital signal ($s_f(n)$) to obtain the derivative signal, $$s_f'(n) = \frac{s_f(n+1) - s_f(n-1)}{2}$$

apply the non-linear Teager-Kaiser function Ψ to the second filtered digital signal $s_f(n)$ for generating the first signal $\Psi_f[s_f(n)]$ representative of the energy content of the second filtered digital signal $s_f(n)$, apply the non-linear Teager-Kaiser function Ψ to the derivative signal $s_f'(n)$ for generating the second signal $\Psi_f[s_f'(n)]$ representative of the energy content of the derivative signal $s_f'(n)$, and process the first signal $\Psi_f[s_f(n)]$ and the second signal $\Psi_f[s_f'(n)]$ for generating the second amplitude value $a_f(n)$ according to the formula (5) reported below:

$$a(n) \cong \frac{2 \cdot \Psi_f[s_f(n)]}{\sqrt{\Psi_f[s_f(n+1) - s_f(n-1)]}}$$

Advantageously, the comparator means 22 are able to compare the value κ(n) of the calculated ratio $$\frac{a(n)}{a_j(n)}$$

with the predetermined threshold value $\kappa_{th}(n)$, the controller 15 able to control the generator 23 to increase, by a predetermined quantity, the second filtering bandwidth value $f_f$, if the ratio value κ(n) calculated by the comparator means 22 is less than or equal to the threshold value $\kappa_{th}(n)$, and the controller 25 are able to control the processing means 21 and the comparator means 22 to compare the value κ(n) of the calculated ratio $$\frac{a(n)}{a_j(n)}$$

with the predetermined threshold value $\kappa_{th}(n)$, until the respective calculated ratio value κ(n) is less than or equal to the threshold value $\kappa_{th}(n)$, such that each second filtering bandwidth value $f_f$ represents a filtering bandwidth value able to reduce/suppress the adjacent channel interference in the modulated digital signal (s(n)).

The apparatus 20, particularly the processing means 21, are able to provide the greatest second filtering bandwidth value $f_f$ for which the ratio value κ(n) calculated by the comparator means 22 is less than the threshold value $\kappa_{th}(n)$, when the current ratio value κ(n) calculated by the comparator means is greater than or equal to the threshold value $\kappa_{th}(n)$. Such greatest second filtering bandwidth value $f_f$ representing the optimal filtering bandwidth value able to reduce/suppress the adjacent channel interference in the modulated digital signal s(n).

In order to reduce or suppress the adjacent channel interference in the received modulated digital signal s(n), the apparatus 20 comprises band-pass filter centered on the predetermined channel angular frequency value $\Omega_c$ and having passband value equal to the greatest second filtering bandwidth filtering value $f_f$ supplied by the apparatus 20.

The aforesaid filter is able to filter the analog signal s(t) of FM type for generating, through the analog-digital converter 101, an FM filtered digital signal substantially free of adjacent channel interference.

It should be pointed out that, advantageously, the aforesaid filter is the same filter 24.

In the case of a modulated digital signal s(n) of AM type received on the predetermined channel angular frequency value $\Omega_c$ for the AM signal, the AM digital signal is composed of a modulating signal and a carrier signal oscillating at the carrier angular frequency $\hat{\Omega}_c$ and is represented by a series of samples.

In this case, the processing means 21 are able to generate the angular frequency value of the carrier signal.

In particular, the processing means 21 are able to receive the predetermined channel angular frequency value $\Omega_c$ and for generating the carrier angular frequency value $\hat{\Omega}_c$ of the carrier signal, and the comparator means 22 are able to calculate the ratio $$\frac{\hat{\Omega}_c}{\Omega_c}$$

between the carrier angular frequency value $\hat{\Omega}_c$ generated by the processing means 21 and the channel angular frequency value $\Omega_c$ received by the processing means 21.

Advantageously, the apparatus 20 is able to provide an optimal filtering bandwidth value able to reduce/suppress the adjacent channel interference in the modulated digital signal s(n), as a function of the ratio $$\frac{\hat{\Omega}_c}{\Omega_c}$$

calculated by the comparator means 22.

In order to reduce or suppress the adjacent channel interference in the received modulated digital signal s(n), the apparatus 20 has the band-pass filter 24 centered on the predetermined channel angular frequency value $\Omega_c$ and having passband values equal to the optimal filtering bandwidth value supplied by the apparatus 20. In this case, the filter is able to filter the analog signal s(t) of AM type so for generating, through the analog-digital conversion means 101, a filtered AM digital signal substantially free of adjacent channel interference.

It should be indicated that the comparison means 22, the generator 23, the filter 24 and the controller 25 can be implemented through circuitry hardware or a sequence of logic instructions or software.

One embodiment is receiver 100 for receiving an analog radio frequency signal s(t) and comprising analog-digital converter means, for example the ADC 101, able to receive the analog signal s(t) in input to convert the analog signal s(t) into a digital signal s(n), the digital signal s(n) being a modulated digital signal affected by adjacent channel interference.

The receiver 100 advantageously comprises the apparatus 20 for detecting the adjacent channel interference in the modulated digital signal s(n).

In order to reduce or suppress the adjacent channel interference in the received modulated digital signal s(n), the receiver 100 comprises the band-pass filter 24 centered on the predetermined channel angular frequency value $\Omega_c$ and having passband value equal to the optimal filtering bandwidth value supplied by the apparatus 20.

Advantageously, the receiver 100 comprises a digital signal processor device or DSP in which the following are incorporated: the processing means 21, the comparison means 22, the generator 23, the filter 24, and the controller 25. In this case, the processing means 11, the comparison means 12, the generator 23, the filter 24, and the controller 25 are advantageously made through a sequence of logic instructions implemented due to the logic present in the DSP.

The receiver 100 can also be inserted in a portable multimedia device 200 which comprises a central processing unit 202 and a plurality of circuits 204, 206, said central unit being able to control the operation of said plurality of circuits, and said plurality of circuits comprising a memory 204 at least one interface 206 chosen from the group comprising a video interface, a keyboard interface, a communication interface, a pen input interface, an audio interface or a combination of these.

The portable multimedia device 200 moreover comprises at least one antenna 208 able to receive the analog radio frequency signal s(t), and the receiver 100 according the above-described invention has a signal input coupled to the respective antenna so to receive the analog radio frequency signal s(t).

For example, the portable multimedia device described above can be a cellular telephone equipped with a digital media player, of MP3 player and/or MP4 player type and/or WMV player digital type.

One embodiment of the invention is a computer readable medium having code portion that causes a numerical processor device, such as the portable multimedia device 200, to perform the methods described above.

As can be appreciated from that described above, the method and apparatus permit satisfying the needs as stated in the introductive part of the present description and to overcome the drawbacks of the methods and apparatuses of the prior art.

In particular, due to the use of the method and apparatus according to the invention, the hardware circuitry necessary for detecting and suppressing the adjacent channel interference in a modulated digital signal is drastically reduced. In particular, the method and the apparatus as well as the receiver according to the invention do not require the use of costly devices such as mixers and external filters for the intermediate frequency.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   suppressing multipath propagation in a modulated digital signal, said suppressing including:
   providing a first value of channel angular frequency, representative of said modulated digital signal free of multipath propagation;
   providing a second value of said channel angular frequency, representative of said modulated digital signal with multipath propagation; and
   detecting the multipath propagation in said modulated digital signal by comparing said first value with said second value;
   wherein providing said second value includes:
   obtaining a derivative signal representative of the derivative of said modulated digital signal by processing said modulated digital signal;
   generating a first signal representative of the energy of said modulated digital signal by applying a non-linear Teager-Kaiser function to said modulated digital signal;
   generating a second signal representative of the energy of said derivative signal by applying said non-linear Teager-Kaiser function to said derivative signal; and
   generating said second value by processing said first signal and said second signal; and
   said comparing includes calculating a ratio between said second value and said first value, said ratio identifying a parameter able to detect multipath propagation in said modulated digital signal if said calculated ratio is less than 1.

2. The method of claim 1, wherein said parameter ($\mu(n)$) is calculated according to the following formula:
   where:
   $\hat{\Omega}_c$ is said $$\mu(n) = \frac{1 - \cos(2 \cdot \hat{\Omega}_c)}{1 - \cos(2 \cdot \Omega_c)}$$

second value which corresponds to the angular frequency of said modulated digital signal with multipath propagation; and
   $\Omega_c$ is said first value which corresponds to the angular frequency of carrier signal.

3. A method, comprising:
   suppressing multipath propagation in a modulated digital signal composed of a carrier signal, oscillating at a carrier frequency, and a modulating signal, said suppressing including:
   providing a first value of channel angular frequency, representative of said modulated digital signal free of multipath propagation;

providing a second value of said channel angular frequency, representative of said modulated digital signal with multipath propagation; and
detecting the multipath propagation in said modulated digital signal by comparing said first value with said second value;
wherein providing said second value includes:
   obtaining a derivative signal representative of the derivative of said modulated digital signal by processing said modulated digital signal;
   generating a first signal representative of the energy of said modulated digital signal by applying a non-linear Teager-Kaiser function to said modulated digital signal;
   generating a second signal representative of the energy of said derivative signal by applying said non-linear Teager-Kaiser function to said derivative signal; and
   generating said second value by processing said first signal and said second signal; and
said step of processing said first signal and said second signal includes generating a signal ($q(n)\Omega_m$) representative of the waveform of said modulating signal ($q(n)$) by applying the following formula:

$$q(n) \cdot \Omega_m \cong \frac{1}{2} \cdot \arccos\left(1 - \frac{\Psi[x(n+1) - x(n-1)]}{2 \cdot \Psi[x(n)]}\right) - \Omega_c$$

where:
$\Psi[x(n)]$ corresponds with said first signal,
$\Psi[x(n+1)-x(n-1)]$ corresponds with said second signal,
$\Omega_c$ is said first value which corresponds with the angular frequency of the carrier signal.

4. The method of claim 3, wherein said step of processing said first signal and said second signal includes generating an equalized signal ($\tilde{q}(n)$) representative of the waveform of said modulating signal by applying the following formula:

$$\tilde{q}(n) \approx \frac{1}{2 \cdot \Omega_m} \cdot \arccos_\mu [1 - \mu(n) + \mu(n) \cdot \cos(2 \cdot \Omega_c + 2 \cdot \Omega_m \cdot q(n))] - \frac{\Omega_c}{\Omega_m}$$

where:
$\Omega_c$ is said first value which corresponds to the angular frequency of the carrier signal $\mu(n)$ is a ratio between said representative value of a processed channel frequency ($\hat{\Omega}_c$) and said first value ($\Omega_c$);
$\arccos_\mu$ is a function which depends on the value of $\mu(n)$;
$q(n)*\Omega_m$ is said signal representative of the waveform of said modulating signal;
said equalized signal ($\tilde{q}(n)$) being able to compensate for the multipath propagation in said modulated digital signal.

5. A method, comprising:
suppressing multipath propagation in a modulated digital signal, said suppressing including:
providing a first value of channel angular frequency, representative of said modulated digital signal free of multipath propagation;
providing a second value of said channel angular frequency, representative of said modulated digital signal with multipath propagation; and
detecting the multipath propagation in said modulated digital signal by comparing said first value with said second value;

wherein providing said second value includes:
   obtaining a derivative signal representative of the derivative of said modulated digital signal by processing said modulated digital signal;
   generating a first signal representative of the energy of said modulated digital signal by applying a non-linear Teager-Kaiser function to said modulated digital signal;
   generating a second signal representative of the energy of said derivative signal by applying said non-linear Teager-Kaiser function to said derivative signal; and
   generating said second value by processing said first signal and said second signal; and
wherein said step of generating said second value ($\hat{\Omega}_c$) is calculated by applying the following formula:

$$\hat{\Omega}_c = \frac{1}{N} \cdot \sum_{n=1}^{N} \frac{1}{2} \cdot \arccos\left(1 - \frac{\Psi_F[s(n+1) - s(n-1)]}{2 \cdot \Psi_F[s(n)]}\right)$$

where N is a number of samples to be analyzed;
$s(n)$ is the modulated digital signal; and
$\Psi_F$ is said non-linear Teager-Kaiser function.

6. An apparatus for suppressing the presence of multipath propagation in a modulated digital signal, said apparatus comprising:
means for providing a preselected value of channel frequency;
derivation means for receiving said digital signal in input and for generating a derivative signal representative of the derivative of said digital signal;
first processing means for receiving said digital signal and said derivative signal in input applying a non-linear Teager-Kaiser function ($\Psi$) to said digital signal to generate a first signal representative of the energy of said digital signal, and applying the a non-linear Teager-Kaiser function to said derivative signal to generate a second signal representative of the energy of the derivative of said digital signal;
second processing means for processing said first signal and said second signal to generate a value representative of a processed channel frequency ($\hat{\Omega}_c$) of said modulated digital signal; and
comparison means for receiving said predetermined channel frequency value and said representative value of a processed channel frequency in input, comparing said predetermined channel frequency value and said representative value of the processed channel frequency to generate a parameter able to detect the presence of multipath propagation in said modulated digital signal, wherein said comparing includes calculating a ratio and generating said parameter is based at least in part on the ratio.

7. The apparatus of claim 6, wherein said comparison means comprise:
a first calculation device having said representative value of a processed channel frequency ($\hat{\Omega}_c$) in input, to calculate a first value, said first value being calculable by means of the following relation:

$$v1 = 1 - \cos(2*(\hat{\Omega}_c))$$

where
$v1$ is said first calculated value
$\hat{\Omega}_c$ is a value which corresponds to the angular frequency of processed carrier frequency;

a second calculation device having in input said predetermined channel frequency value, to calculate a second value, said second value being calculable by means of the following relation:

$$v2 = 1 - \cos(2*(\hat{\Omega}_c))$$

where:
v2 is said second calculated value;
$\hat{\Omega}_c$ corresponds to the angular frequency of carrier frequency;
said comparison means including means for calculating the ratio, the ratio being between said first value and said second value, to generate said parameter able to detect the presence of multipath propagation in said modulated digital signal, by means of the following relation:

$$\mu(n) = \frac{v(1)}{v(2)}.$$

8. The apparatus of claim 7, wherein said digital signal is an FM signal, said second processing means including means for processing said first signal and said second signal so to generate an ideal signal representative of the waveform of said modulating signal by applying the following formula:

$$q(n) \cdot \Omega_m \cong \frac{1}{2} \cdot \arccos\left(1 - \frac{\Psi[x(n+1) - x(n-1)]}{2 \cdot \Psi[x(n)]}\right) - \Omega_c$$

where:
$\Psi[x(n)]$ corresponds with said first signal,
$\Psi[x(n+1)-x(n-1)]$ corresponds with said second signal,
$\hat{\Omega}_c$ corresponds with the angular frequency of carrier frequency.

9. The apparatus of claim 8, wherein said digital signal is an FM signal, said second processing means including means for processing said first signal and said second signal so to generate a non-equalized signal ($\hat{q}(_n)$) representative of the waveform of said modulating signal by applying the following formula:

$$\hat{q}(n) \cong \frac{1}{2 \cdot \Omega_m} \cdot \arccos\left\{\mu(n) \cdot \left[\frac{1 - \mu(n)}{\mu(n)} + \cos(2 \cdot \Omega_c + 2 \cdot \Omega_m \cdot q(n))\right]\right\} - \frac{\Omega_c}{\Omega_m}$$

where
$\hat{\Omega}_c$ corresponds to the angular frequency of carrier frequency $\mu(n)$ is the ratio between said representative value of a processed channel frequency ($\hat{\Omega}_c$) and said preselected channel frequency value $q(n)*\Omega_m$ is said signal representative of the waveform of said modulating signal.

10. The apparatus of claim 6, where said derivation means, said first processing means, said second processing means and said comparison means are implemented in a single DSP device.

11. A receiver to receiving a radio frequency analog signal, comprising:
an analog-digital converter structured to receive said analog signal in input, to convert said analog signal into a digital signal, said digital signal being a modulated digital signal; and
an apparatus for suppressing multipath propagation in said modulated digital signal, said modulated digital signal being received with a preselected channel frequency value, said apparatus including:
means for providing a preselected value of channel frequency;
derivation means for receiving said digital signal in input and for generating a derivative signal representative of the derivative of said digital signal;
first processing means for receiving said digital signal and said derivative signal in input applying a non-linear Teager-Kaiser function ($\Psi$) to said digital signal to generate a first signal representative of the energy of said digital signal, and applying the a non-linear Teager-Kaiser function to said derivative signal to generate a second signal representative of the energy of the derivative of said digital signal;
second processing means for processing said first signal and said second signal to generate a value representative of a processed channel frequency ($\hat{\Omega}_c$) of said modulated digital signal; and
comparison means for receiving said predetermined channel frequency value and said representative value of a processed channel frequency in input, comparing said predetermined channel frequency value and said representative value of the processed channel frequency to generate a parameter able to detect the presence of multipath propagation in said modulated digital signal, wherein said comparing includes calculating a ratio and generating said parameter is based at least in part on the ratio.

12. A portable multimedia device comprising:
a plurality of circuits, said plurality of circuits comprising at least one interface chosen from among the group comprising a video interface, a keyboard interface, a communication interface, a pen input interface, an audio interface or a combination of the interfaces;
a central unit structured to control said plurality of circuits;
an antenna structured to receive a radio frequency analog signal,
a receiver having an input coupled to said antenna for receiving said analog signal, said receiver including:
an analog-digital converter structured to receive said analog signal in input, to convert said analog signal into a digital signal, said digital signal being a modulated digital signal; and
an apparatus for suppressing multipath propagation in said modulated digital signal, said modulated digital signal being received with a preselected channel frequency value, said apparatus including:
means for providing a preselected value of channel frequency;
derivation means for receiving said digital signal in input and for generating a derivative signal representative of the derivative of said digital signal;
first processing means for receiving said digital signal and said derivative signal in input applying a non-linear Teager-Kaiser function ($\Psi$) to said digital signal to generate a first signal representative of the energy of said digital signal, and applying the a non-linear Teager-Kaiser function to said derivative signal to generate a second signal representative of the energy of the derivative of said digital signal;
second processing means for processing said first signal and said second signal to generate a value representative of a processed channel frequency ($\hat{\Omega}_c$) of said modulated digital signal; and
comparison means for receiving said predetermined channel frequency value and said representative value of a processed channel frequency in input, comparing said predetermined channel frequency value and said representative value of the processed channel frequency to generate a parameter able to detect the presence of multipath propagation in said modulated digital signal, wherein said comparing includes calculating a ratio and generating said parameter is based at least in part on the ratio.

13. A non-transitory computer-readable medium comprising program code that causes a computing device to implement a method that includes:
  suppressing multipath propagation in a modulated digital signal, said suppressing including:
  providing a first value of channel angular frequency, representative of said modulated digital signal free of multipath propagation;
  providing a second value of said channel angular frequency, representative of said modulated digital signal with multipath propagation; and
  detecting the multipath propagation in said modulated digital signal by comparing said first value with said second value;
  wherein providing said second value includes:
    obtaining a derivative signal representative of the derivative of said modulated digital signal by processing said modulated digital signal;
    generating a first signal representative of the energy of said modulated digital signal by applying a non-linear Teager-Kaiser function to said modulated digital signal;
    generating a second signal representative of the energy of said derivative signal by applying said non-linear Teager-Kaiser function to said derivative signal; and
    generating said second value by processing said first signal and said second signal; and
  said comparing includes calculating a ratio between said second value and said first value, said ratio identifying a parameter able to detect multipath propagation in said modulated digital signal if said calculated ratio is less than 1.

14. A method, comprising:
  detecting adjacent channel interference in a modulated digital signal, said detecting including:
  a) providing a first value of a characteristic parameter of said digital signal, representative of said modulated digital signal free of adjacent channel interference;
  b) providing a second value of said characteristic parameter of said digital signal, representative of said modulated digital signal affected by adjacent channel interference; and
  c) detecting adjacent channel interference in said modulated digital signal by comparing said first value with said second value,
  wherein
  said step b) of providing the second value comprises:
  b1) processing said modulated digital signal to obtain a derivative signal representative of the derivative of said modulated digital signal;
  b2) generating a first signal representative of energy content of said modulated digital signal by applying a non-linear Teager-Kaiser function ($\Psi$) to said modulated digital signal
  b3) generating a second signal representative of energy content of said derivative signal by applying said non-linear Teager-Kaiser function ($\Psi$) to said derivative signal; and
  b4) generating said second value by processing said first signal and said second signal; and
  said comparison step c) comprises calculating a ratio between said second value and said first value, the adjacent channel interference in said modulated digital signal being detected when said calculated ratio is different from 1.

15. The method of claim 14 wherein the adjacent channel interference in said modulated digital signal is detected when said calculated ratio is greater than 1, if said modulated digital signal is a frequency modulation (FM) signal, and is detected when said calculated ratio is greater or less than 1, when said modulated digital signal is an amplitude modulation (AM) signal.

16. The method of claim 14, wherein said modulated digital signal is a frequency modulation (FM) signal received on a preselected channel angular frequency value, said FM digital signal being composed of a modulating signal and a carrier signal and being represented by a series of samples, said characteristic parameter being a carrier signal amplitude value.

17. The method of claim 16, wherein said FM modulated digital signal has a predefined frequency deviation, said method comprising:
  setting a first filtering bandwidth value which is less than said predefined frequency deviation, and a second filtering bandwidth value comprised between said first filtering bandwidth value and said predefined frequency deviation;
  generating a first amplitude value of the carrier signal representative of said digital signal free of adjacent channel interference; and
  generating a second amplitude value of the carrier signal representative of said digital signal affected by adjacent channel interference.

18. The method of claim 17, comprising:
  generating said modulated digital signal by analog-digital converting a modulated analog signal,
  said step a) comprising:
  a1) filtering said analog signal with a filtering angular frequency centered on said preselected channel angular frequency value and with a passband equal to said first filtering band, for generating a first filtered digital signal from the analog-digital converting step,
  a2) carrying out the steps from b1) to b4), substituting said modulated digital signal with said first filtered digital signal, for generating said first amplitude value of the carrier signal of said first filtered digital signal, representative of said modulated digital signal free of adjacent channel interference,
  said step b) comprising the steps of:
  filtering said analog signal, with a filtering angular frequency centered on said preselected channel angular frequency value and with a passband equal to said second filtering band, for generating a second filtered digital signal from the analog-digital converting step,
  carrying out the steps from b1) to b4), substituting said modulated digital signal with said second filtered digital signal, for generating said second amplitude value of the carrier signal of said second filtered digital signal, representative of said digital signal affected by adjacent channel interference,
  said step c) comprising the step of calculating the value of the ratio between said second amplitude value and said first amplitude value.

19. The method of claim 16, wherein said carrier signal amplitude value is generated by applying the following formula:

$$a(n) \cong \frac{2 \cdot \Psi[s(n)]}{\sqrt{\Psi[s(n+1) - s(n-1)]}}$$

in which:
$\Psi[s(n)]$ corresponds to said first signal, and
½·$\Psi[s(n+1)-s(n-1)]$ corresponds to said second signal.

20. The method of claim 17, wherein said comparison step c) comprises the step of comparing the value of said calculated ratio with a predetermined threshold value,
said method comprising the steps of:
d) increasing, by a predefined quantity, the second filtering bandwidth value, and
e) recursively repeating the steps b), c) and d) for the respective second increased filtering bandwidth value, until the corresponding calculated ratio value is less than or equal to said threshold value, each second filtering bandwidth value representing a filtering bandwidth value able to reduce/suppress the adjacent channel interference in said modulated digital signal, and
f) obtaining the greatest second filtering bandwidth value for which the calculated ratio value is less than or equal to the threshold value, when the calculated ratio value becomes greater than said threshold value, said greatest second filtering bandwidth value representing an optimal filtering bandwidth value able to reduce/suppress the adjacent channel interference in said modulated digital signal.

21. The method of claim 14, wherein said modulated digital signal is an amplitude modulation (AM) signal received on a preselected channel carrier angular frequency value, said AM digital signal being composed of a modulating signal and a carrier signal oscillating at a channel carrier angular frequency and being represented by a series of samples, said characteristic parameter being a channel carrier angular frequency value.

22. The method of claim 21, wherein
said step a) comprises the step of receiving said predetermined channel carrier angular frequency value,
said step b) generates the value of said channel carrier angular frequency of the modulated digital signal,
said step c) comprises the step of calculating the ratio between said generated channel carrier angular frequency value and said received channel carrier angular frequency value.

23. The method of claim 22, wherein said channel carrier angular frequency value of the modulated digital signal is generated by applying the following formula:

$$\hat{\Omega}_c \cong \frac{1}{2} \cdot \arccos\left(1 - \frac{\Psi[s(n+1) - s(n-1)]}{2 \cdot \Psi[s(n)]}\right)$$

in which
$\Psi[s(n)]$ corresponds to said first signal, and
$\Psi[s(n+1)-s(n-1)]$ corresponds to said second signal.

24. The method of claim 21, comprising obtaining an optimal filtering bandwidth value able to reduce/suppress the adjacent channel interference in said modulated digital signal, as a function of the result of said comparison step c).

25. The method of claim 24, comprising:
generating said modulated digital signal by analog-digital converting a modulated analog signal; and
reducing adjacent channel interference in a modulated digital signal received on a predetermined channel angular frequency value, said reducing including:
filtering said analog signal with a filtering angular frequency centered on the preselected channel angular frequency value and with a passband equal to said obtained optimal filtering bandwidth value, for generating, from the analog-digital converting, a filtered digital signal substantially free of adjacent channel interference.

26. An apparatus for detecting adjacent channel interference in a modulated digital signal, said apparatus comprising:
processing means for:
receiving said digital signal in input,
providing a first value of a characteristic parameter of said digital signal, representative of said modulated digital signal free of adjacent channel interference, and
providing a second value of said characteristic parameter of said digital signal, representative of said modulated digital signal affected by adjacent channel interference; and
comparator means, coupled to said processing means, for calculating a ratio between said second value and said first value, the adjacent channel interference in said modulated digital signal being detected when the value of said calculated ratio is different from 1,
wherein said processing means including means for:
processing said digital signal to obtain a derivative signal representative of the derivative of said digital signal,
applying a non-linear Teager-Kaiser function ($\Psi$) to said digital signal for generating a first signal representative of energy content of said digital signal,
applying said non-linear Teager-Kaiser function to said derivative signal for generating a second signal representative of energy content of said derivative signal, and
processing said first signal and said second signal for generating said second value of said characteristic parameter of said digital signal, representative of said modulated digital signal affected by adjacent channel interference.

27. The apparatus of claim 26, wherein said comparator means are for generating a value able to detect the adjacent channel interference in said modulated digital signal.

28. The apparatus of claim 26, wherein the adjacent channel interference in said modulated digital signal is detected when the value of said calculated ratio is greater than 1, if said modulated digital signal is a frequency modulation (FM) signal, and is detected when said calculated ratio is greater or less than 1, when said modulated digital signal is an AM signal.

29. The apparatus of claim 26, wherein said modulated digital signal is a frequency modulation (FM) signal received on a predetermined channel angular frequency value, said FM digital signal being composed of a modulating signal and a carrier signal and being represented by a series of samples, said processing means being for generating a carrier signal amplitude value.

30. An apparatus for detecting adjacent channel interference in a modulated digital signal, said apparatus comprising:
processing means for:
receiving said digital signal in input,
providing a first value of a characteristic parameter of said digital signal, representative of said modulated digital signal free of adjacent channel interference, and providing a second value of said characteristic parameter of said digital signal, representative of said modulated digital signal affected by adjacent channel interference; and comparator means, coupled to said processing means, for comparing said first value with said second value to detect the adjacent channel interference in said modulated digital signal, wherein said processing means including means for:

processing said digital signal to obtain a derivative signal representative of the derivative of said digital signal, applying a non-linear Teager-Kaiser function ($\Psi$) to said digital signal for generating a first signal representative of energy content of said digital signal, applying said non-linear Teager-Kaiser function to said derivative signal for generating a second signal representative of energy content of said derivative signal, and processing said first signal and said second signal for generating said second value of said characteristic parameter of said digital signal, representative of said modulated digital signal affected by adjacent channel interference;

wherein said modulated digital signal is a frequency modulation (FM) signal received on a predetermined channel angular frequency value, said FM digital signal being composed of a modulating signal and a carrier signal and being represented by a series of samples, said processing means being for generating a carrier signal amplitude value; and wherein said FM modulated digital signal has a predefined frequency deviation, said apparatus furthermore comprising:

bandwidth value generator means for receiving said predefined frequency deviation in input, for generating a first filtering bandwidth value which is less than the value of said predefined frequency deviation, and for generating a second filtering bandwidth value comprised between said first filtering bandwidth value and said value of the predefined frequency deviation.

31. The apparatus of claim 30, comprising:

analog-digital conversion means for receiving a modulated analog signal and for converting said modulated analog signal into said modulated digital signal, band-pass filtering means coupled to said conversion means, said band-pass filtering means being centered on said predetermined channel angular frequency value and having a passband, control means, coupled to said generator means, for setting said first filtering bandwidth value and said second filtering bandwidth value to said passband of said filtering means, said filtering means being for filtering said analog signal generating a first filtered digital signal, when said control means set said passband equal to said first filtering bandwidth value and for generating a second filtered signal, when said control means set said passband equal to said second filtering bandwidth value, said processing means being for:

processing said first filtered digital signal for generating a first amplitude value of the carrier signal of said first filtered digital signal, representative of said digital signal free of adjacent channel interference, processing said second filtered digital signal) for generating a second amplitude value of the carrier signal of said second filtered digital signal, representative of said digital signal affected by adjacent channel interference, said comparator means being for calculating a ratio between said second amplitude value and said first amplitude value.

32. The apparatus of claim 31, wherein said processing means are for:

processing said first filtered digital signal and said second filtered digital signal) to obtain a respective derivative signal, applying a non-linear Teager-Kaiser function to said first filtered digital signal and said second filtered digital signal for generating a respective first signal representative of the energy content of the respective filtered digital signal, applying said non-linear Teager-Kaiser function to the respective derivative signal for generating a respective second signal representative of the energy content of the respective derivative signal, and processing the respective first signal and the respective second signal of said first filtered digital signal and said second filtered digital signal to respectively generate said first amplitude value and said second amplitude value.

33. The apparatus of claim 32, wherein said processing means are for generating said carrier signal amplitude value by applying the following formula:

$$a(n) \cong \frac{2 \cdot \Psi[s(n)]}{\sqrt{\Psi[s(n+1) - s(n-1)]}}$$

in which:

$\Psi[s(n)]$ corresponds to said first signal, and $$\frac{1}{2} \cdot \Psi[s(n+1) - s(n-1)]$$

corresponds to said second signal.

34. The apparatus of claim 31, wherein:

said comparator means are for comparing said calculated ratio with a predetermined threshold value, said control means are for controlling said generator means to increase, by a predefined quantity, the second filtering bandwidth value, if said ratio calculated by said comparator means is less than or equal to said threshold value, said control means are for controlling said processing means and said comparator means for comparing said calculated ratio with said predetermined threshold value, until the respective calculated ratio value is less than or equal to said threshold value, each second filtering bandwidth value representing a filtering angular bandwidth value able to reduce/suppress the adjacent channel interference in said modulated digital signal, said apparatus includes means for providing the greatest second filtering bandwidth value for which the ratio calculated by said comparator means is less than the threshold value, when the ratio calculated by said comparator means is greater than or equal to said threshold value, said greatest second filtering bandwidth value representing the optimal filtering bandwidth value able to reduce/suppress the adjacent channel interference in said modulated digital signal.

35. The apparatus of claim 26, wherein said modulated digital signal is an AM signal received on a predetermined channel carrier angular frequency value, said AM digital signal being composed of a modulating signal and a carrier signal oscillating at a channel carrier angular frequency and being represented by a series of samples, said processing means being for generating a channel carrier angular frequency value.

36. The apparatus of claim 35, wherein:
said processing means are for receiving said predetermined channel carrier angular frequency value, and generating said channel carrier angular frequency value of the modulated digital signal; and
said comparator means are for calculating a ratio between said generated channel carrier angular frequency value and said received channel carrier angular frequency value.

37. The apparatus of claim 36, wherein said processing means are for calculating said channel carrier angular frequency value of the modulated digital signal by applying the following formula:

$$\hat{\Omega}_c \cong \frac{1}{2} \cdot \arccos\left(1 - \frac{\Psi[s(n+1) - s(n-1)]}{2 \cdot \Psi[s(n)]}\right)$$

in which:
$\Psi[s(n)]$ corresponds to said first signal, and $$\frac{1}{2} \cdot \Psi[s(n+1) - s(n-1)]$$

corresponds to said second signal.

38. The apparatus of claim 37, comprising means for providing an optimal filtering angular bandwidth value able to reduce/suppress the adjacent channel interference in said modulated digital signal, as a function of the value of said ratio calculated by said comparator means.

39. The apparatus of claim 34, further comprising:
means for suppressing the adjacent channel interference in the modulated digital signal, including:
band-pass filtering means for receiving said optimal filtering bandwidth value, said band-pass filtering means being centered on said predetermined channel angular frequency value and having angular passband value equal to said optimal filtering angular bandwidth value, said filtering means being for filtering said analog signal for generating, through an analog-digital converter, a filtered digital signal substantially free of adjacent channel interference.

40. A receiver for receiving an analog radio frequency signal, comprising:
an analog-digital converter structured to receive said analog signal and convert said analog signal into a digital signal, said digital signal being a modulated digital signal affected by adjacent channel interference; and
an apparatus for detecting the adjacent channel interference in said modulated digital signal, the apparatus including:
processing means for:
receiving said digital signal in input,
providing a first value of a characteristic parameter of said digital signal, representative of said modulated digital signal free of adjacent channel interference, and
providing a second value of said characteristic parameter of said digital signal, representative of said modulated digital signal affected by adjacent channel interference; and comparator means, coupled to said processing means, for comparing said first value with said second value to detect the adjacent channel interference in said modulated digital signal,
wherein said processing means including means for:
processing said digital signal to obtain a derivative signal representative of the derivative of said digital signal,
applying a non-linear Teager-Kaiser function ($\Psi$) to said digital signal for generating a first signal representative of energy content of said digital signal,
applying said non-linear Teager-Kaiser function to said derivative signal for generating a second signal representative of energy content of said derivative signal, and
processing said first signal and said second signal for generating said second value of said characteristic parameter of said digital signal, representative of said modulated digital signal affected by adjacent channel interference, and wherein:
said modulated digital signal is an AM signal received on a predetermined channel carrier angular frequency value, said AM digital signal being composed of a modulating signal and a carrier signal oscillating at a channel carrier angular frequency and being represented by a series of samples, said processing means being for generating a channel carrier angular frequency value;
said processing means are for receiving said predetermined channel carrier angular frequency value, and generating said channel carrier angular frequency value of the modulated digital signal;
said comparator means are for calculating a ratio between said generated channel carrier angular frequency value and said received channel carrier angular frequency value; and
said processing means are for calculating said channel carrier angular frequency value of the modulated digital signal by applying the following formula:

$$\hat{\Omega}_c \cong \frac{1}{2} \cdot \arccos\left(1 - \frac{\Psi[s(n+1) - s(n-1)]}{2 \cdot \Psi[s(n)]}\right)$$

in which:
$\Psi[s(n)]$ corresponds to said first signal, and $$\frac{1}{2} \cdot \Psi[s(n+1) - s(n-1)]$$

corresponds to said second signal, the apparatus further comprising:
means for providing an optimal filtering angular bandwidth value able to reduce/suppress the adjacent channel interference in said modulated digital signal, as a function of the value of said ratio calculated by said comparator means; and
means for suppressing the adjacent channel interference in the modulated digital signal, the means for suppressing including:
band-pass filtering means for receiving said optimal filtering bandwidth value, said band-pass filtering means being centered on said predetermined channel angular frequency value and having angular passband value equal to said optimal filtering angular bandwidth value, said filtering means being for filtering said analog signal for generating, through an analog-digital converter, a filtered digital signal substantially free of adjacent channel interference.

41. A portable multimedia device comprising:
- a plurality of circuits that includes at least one interface chosen from the group comprising a video interface, a keyboard interface, a communication interface, a pen input interface, an audio interface or a combination of the interfaces;
- a central unit structured to control said plurality of circuits;
- an antenna structured to receive an analog radio frequency signal; and
- a receiver having an input coupled to said antenna for receiving said analog radio frequency signal, said receiver including:
- an analog-digital converter structured to receive said analog signal and convert said analog signal into a digital signal, said digital signal being a modulated digital signal affected by adjacent channel interference; and
- an apparatus for detecting the adjacent channel interference in said modulated digital signal, the apparatus including:
- processing means for:
  - receiving said digital signal in input,
  - providing a first value of a characteristic parameter of said digital signal, representative of said modulated digital signal free of adjacent channel interference, and
  - providing a second value of said characteristic parameter of said digital signal, representative of said modulated digital signal affected by adjacent channel interference; and
- comparator means, coupled to said processing means, for calculating a ratio between said second value and said first value, the adjacent channel interference in said modulated digital signal being detected based at least in part on the calculated ratio,
- wherein said processing means including means for:
- processing said digital signal to obtain a derivative signal representative of the derivative of said digital signal, applying a non-linear Teager-Kaiser function ($\Psi$) to said digital signal for generating a first signal representative of energy content of said digital signal applying said non-linear Teager-Kaiser function to said derivative signal for generating a second signal representative of energy content of said derivative signal processing said first signal and said second signal for generating said second value of said characteristic parameter of said digital signal, representative of said modulated digital signal affected by adjacent channel interference.

42. A computer-readable medium comprising program code that causes a computing device to implement a method that includes:
- detecting adjacent channel interference in a modulated digital signal, said detecting including:
  - a) providing a first value of a characteristic parameter of said digital signal, representative of said modulated digital signal free of adjacent channel interference;
  - b) providing a second value of said characteristic parameter of said digital signal, representative of said modulated digital signal affected by adjacent channel interference; and
  - c) detecting adjacent channel interference in said modulated digital signal by calculating a ratio between said first value with said second value,
- wherein said step b) of providing the second value comprises:
  - b1) processing said modulated digital signal to obtain a derivative signal representative of the derivative of said modulated digital signal;
  - b2) generating a first signal representative of energy content of said modulated digital signal by applying a non-linear Teager-Kaiser function ($\Psi$) to said modulated digital signal
  - b3) generating a second signal representative of energy content of said derivative signal by applying said non-linear Teager-Kaiser function ($\Psi$) to said derivative signal; and
  - b4) generating said second value by processing said first signal and said second signal.

* * * * *

UNITED STATES PATENT AND TRADEMARK OFFICE
CERTIFICATE OF CORRECTION

PATENT NO. : 8,098,720 B2
APPLICATION NO. : 11/869661
DATED : January 17, 2012
INVENTOR(S) : Francesco Adduci It is certified that error appears in the above-identified patent and that said Letters Patent is hereby corrected as shown below:

Column 33, Line 6:
" $v2=1-\cos(2*(\hat{\Omega}_c))$ " should read, -- $v2=1-\cos(2*(\Omega_c))$ --.

Column 33, Line 10:
" $\hat{\Omega}_c$ corresponds to the angular frequency of carrier" should read, -- $\Omega_c$ corresponds to the angular frequency of carrier--.

Column 33, Line 35:
" $\hat{\Omega}_c$ corresponds with the angular frequency of carrier" should read, -- $\Omega_c$ corresponds with the angular frequency of carrier--.

Column 33, Line 50:
" $\hat{\Omega}_c$ corresponds to the angular frequency of carrier" should read, -- $\Omega_c$ corresponds to the angular frequency of carrier--.

Signed and Sealed this
Eighteenth Day of December, 2012

David J. Kappos
*Director of the United States Patent and Trademark Office*